US012385774B2

(12) United States Patent
Cuniasse et al.

(10) Patent No.: US 12,385,774 B2
(45) Date of Patent: Aug. 12, 2025

(54) WEIGHING DEVICE WITH A WHEATSTONE BRIDGE ASSEMBLY AND METHOD

(71) Applicant: WITHINGS, Issy les Moulineaux (FR)

(72) Inventors: Pierre-Antoine Cuniasse, Issy les Moulineaux (FR); Guillaume Faussard, Issy les Moulineaux (FR); Xavier Premel, Issy les Moulineaux (FR)

(73) Assignee: WITHINGS, Issy les Moulineaux (FR)

( * ) Notice: Subject to any disclaimer, the term of this patent is extended or adjusted under 35 U.S.C. 154(b) by 338 days.

(21) Appl. No.: 17/794,220

(22) PCT Filed: Apr. 15, 2021

(86) PCT No.: PCT/FR2021/050661
§ 371 (c)(1),
(2) Date: Jul. 20, 2022

(87) PCT Pub. No.: WO2021/209720
PCT Pub. Date: Oct. 21, 2021

(65) Prior Publication Data
US 2023/0138345 A1        May 4, 2023

(30) Foreign Application Priority Data

Apr. 16, 2020  (FR) ........................... 2003832

(51) Int. Cl.
*G01G 3/14*  (2006.01)
*G01G 19/44*  (2006.01)

(52) U.S. Cl.
CPC .......... *G01G 3/1406* (2013.01); *G01G 19/44* (2013.01)

(58) Field of Classification Search
CPC ............................. G01G 19/44; G01G 3/1406
See application file for complete search history.

(56) References Cited

U.S. PATENT DOCUMENTS 3,968,850 A * 7/1976 Gaskill .................... G01G 7/04
177/210 R
6,843,109 B2 * 1/2005 Nakada ................. G01M 1/122
73/65.01

(Continued)

FOREIGN PATENT DOCUMENTS

CN        107894273 A  *  4/2018
WO    WO 2014/013208 A1    1/2014

OTHER PUBLICATIONS

International Search Report as issued in International Patent Application No. PCT/FR2021/050661, dated Jul. 20, 2021.

*Primary Examiner* — Natalie Huls
(74) *Attorney, Agent, or Firm* — Pillsbury Winthrop Shaw Pittman LLP

(57) ABSTRACT

A weighing device of the electronic bathroom scale type, includes four feet, each fitted with a load cell, each load cell including two resistors combined in a Wheatstone bridge type of assembly to define a first axis of symmetry and a second axis of symmetry, the assembly further including at least one auxiliary circuit configured to selectively short-circuit two resistors belonging to the same foot or to two neighboring feet in the bathroom scale, the first auxiliary circuit being symmetrical relative to the first axis or the second axis, the assembly being controlled by an electronic control unit to estimate a weight and to estimate an offset of a user on the bathroom scale.

20 Claims, 19 Drawing Sheets

(56) References Cited

U.S. PATENT DOCUMENTS

| | | | | |
|---|---|---|---|---|
| 11,346,703 B1* | 5/2022 | Beltzer | .............. | G01G 19/4144 |
| 11,808,617 B2* | 11/2023 | Khanuja | .............. | G01G 21/283 |
| 2015/0160068 A1* | 6/2015 | Carreel | ................ | G01G 3/1404 |
| | | | | 177/1 |

* cited by examiner

$$\begin{bmatrix} P \\ G/D \\ A/P \end{bmatrix} = \begin{bmatrix} A1 & A4 & A5 \\ A6 & A2 & A9 \\ A7 & A8 & A3 \end{bmatrix} \times \begin{bmatrix} M1 \\ M2 \\ M3 \end{bmatrix}$$

Transition matrix A

WEIGHING DEVICE WITH A WHEATSTONE BRIDGE ASSEMBLY AND METHOD

CROSS-REFERENCE TO RELATED APPLICATIONS

This application is the U.S. National Stage of PCT/FR2021/050661, filed Apr. 15, 2021, which in turn claims priority to French patent application number 2003832 filed Apr. 16, 2020. The content of these applications are incorporated herein by reference in their entireties.

TECHNICAL FIELD

This disclosure relates to weighing devices and methods. More particularly, this disclosure relates to the field of electronic bathroom scales.

PRIOR ART

Electronic bathroom scales, also called personal scales, are commonly equipped with four feet, each of these feet comprising a load cell. Such a configuration makes it possible to measure the weight of a user when he stands on the scale.

Conventionally, the load cells of the scale are arranged in a Wheatstone bridge type of assembly. Then the loads measured by each of the load cells can be used to estimate the weight of a user.

However, it has been found that when the loads measured by each of the load cells are not equal, the estimate of the user's weight can vary. This variability is due in particular to imperfections in the assembly used, as well as to the user being offset relative to the center of the scale.

Thus, document WO2014/013208 describes an optimized load cell assembly, for establishing the weight of a user as well as for measuring his offset relative to the center of the scale. The assembly has two separate Wheatstone bridges, each comprising two load cells connected to a dedicated amplifier. The measured offset is transmitted to the user, allowing the user to recenter himself in order to improve the weight estimate.

This assembly allows effectively estimating an offset of the user. However, this assembly requires two Wheatstone bridges, connected to two amplifiers, which leads to an increase in energy consumption related to weighing. In addition, it has been found that, depending on the arrangement of the load cells in the Wheatstone bridges, the estimation of an offset in the front/rear direction or the right/left direction remains imprecise and with room for improvement. In addition, this assembly requires intervention by the user, who must lean or reposition himself to correct his offset.

There is therefore a need for a scale which makes it possible to reduce the influence of the offset of a user, which does not have the disadvantages of the prior art.

Moreover, there are devices, for example Nintendo's Wii Balance Board, which exploit the user's offset to interact with a platform, for example to play games. However, this type of device uses four Wheatstone bridges, resulting in a high production cost.

SUMMARY

A weighing device of the electronic bathroom scale type is proposed that comprises four feet, respectively left front, right front, left rear, and right rear, the left front foot comprising a left front load cell, the right front foot comprising a right front load cell, the left rear foot comprising a left rear load cell, and the right rear foot comprising a right rear load cell, each load cell comprising at least two resistors, the load cells being combined in a Wheatstone bridge type of assembly comprising:

a first branch and a second branch, the first and second branches being mounted in parallel between a reference voltage and a ground potential, the first and second branches being arranged on either side of a first axis of symmetry passing through the reference voltage and the ground potential;

a first intermediate point, on the first branch, and a second intermediate point, on the second branch, the first and second branch comprising the same number of resistors on either side of the first and second intermediate point, respectively, in order to define a second axis of symmetry passing through the first and second intermediate points; and a first auxiliary circuit, configured to selectively short-circuit two resistors belonging to the same foot or to two neighboring feet (called the first foot (feet)) in the bathroom scale, the first auxiliary circuit being symmetrical relative to the first axis or the second axis, the assembly being controlled by an electronic control unit, to estimate a weight and to estimate an offset of a user on the bathroom scale.

Advantageously, such an assembly makes it possible to modify the contribution of a load cell to a measurement of the output signal from the assembly. Indeed, through several measurements of the output signal with different contributions, it appears possible to ascertain an estimate of the weight and the offset of a user on the scale. Thus, it appears possible to estimate the weight of the user cleared of any offset, without any intervention by the user. In addition, it appears possible to exploit the offset dynamically to allow the user to interact with the scale, in order to clean a ballistocardiography (BCG) signal and/or to analyze the user's balance. In addition, the proposed assembly reduces the components and energy required for the bathroom scale to operate.

The features set forth in the following paragraphs may optionally be implemented. They may be implemented independently of each other or in combination with each other.

The assembly may comprise a second auxiliary circuit, the second auxiliary circuit being configured to short-circuit two resistors belonging to the same second foot or to two neighboring second feet in the bathroom scale, the second auxiliary circuit being symmetrical relative to the first axis or second axis. In particular, at least one resistor short-circuited by the first auxiliary circuit and at least one resistor short-circuited by the second auxiliary circuit belong to two neighboring feet.

Thus, by the use of two auxiliary circuits, three measurements of the output signal from the assembly can be made, each with contributions from different load cells. It is therefore possible to ascertain a value algebraically for the weight and offset of the user on the scale in the front/rear direction and in the right/left direction.

The assembly may comprise a third auxiliary circuit, the third auxiliary circuit being symmetrical relative to the first axis or second axis, the first, second, and third auxiliary circuits being configured to concern three among the four load cells. This means that the first, second, and third auxiliary circuits are configured to short-circuit three of the four load cells or to short-circuit at least one resistor of three load cells among the four load cells.

Thus, the third auxiliary circuit can allow a fourth measurement of the output signal from the assembly, each of the measurements having contributions from different load cells. In addition to the weight and the offsets, it is then possible to ascertain a torsion value for the plate on which the load cells of the bathroom scale are mounted.

The set of resistors affected by the short circuits of the auxiliary circuit(s) can belong to at least two separate load cells.

The or each auxiliary circuit may include at least one switch, for example a transistor, controlled by the electronic control unit. The switch can also be an opto-isolator.

Thus, the or each auxiliary circuit can be selectively controlled to an open state or a closed state, to form a short circuit. Then several measurements of the output signal can be made.

The or each auxiliary circuit may have two switches, preferably two transistors, controlled by the electronic control unit.

A transistor is not perfectly symmetrical; this configuration allows better symmetry of the assembly.

The or each auxiliary circuit can be connected to at least one among: the reference voltage, the ground potential, the first intermediate point, or the second intermediate point. When the auxiliary circuit is connected to the reference voltage or to the ground potential, a reduction in the signal-to-noise ratio (SNR) is observed, while the rest of the bridge is powered at the reference voltage during the short circuit.

The intermediate points can be connected to a single amplifier in order to obtain an output signal from the assembly.

This configuration makes it possible to obtain an output signal usable by the electronic control unit to estimate the users weight and offset. In addition, the single amplifier allows better energy efficiency of the device, requiring only one amplifier to obtain a usable output signal.

The device may comprise a display, configured to display information to a user. The user can thus be informed of the measurements made by the scale, in particular his weight. The display also allows user interaction with the scale.

The device may comprise a communication module configured to exchange data with a smartphone and/or a server. The user can thus access the measurements made by the bathroom scale, at a distance from the bathroom scale. Measurement tracking can be carried out. The personal scale can also receive additional data from the server and/or the smartphone, for example about the user on the personal scale.

According to another aspect, a method implemented in the weighing device is proposed, comprising:
performing a first measurement of the output signal from the assembly;
controlling the first auxiliary circuit into the closed state;
performing a second measurement of the output signal from the assembly;
establishing a weight and offset of a user based on the first and second measurements.

This method makes it possible to perform measurements of the output signal from the assembly with contributions from different load cells. The output signal of each measurement can be used by the bathroom scale to establish the user's weight and offset. The weight can be transmitted to the user, and the offset can be used to clean the BCG signal, analyze a user's balance, and/or allow the user to interact with the bathroom scale.

The features set forth in the following paragraphs may optionally be implemented. They may be implemented independently of each other or in combination with each other.

The method may include, after the second measurement:
controlling the second auxiliary circuit into the closed state;
performing a third measurement of the output signal from the assembly;
establishing a weight, front-rear offset, and right-left offset of a user, based on the first, second, and third measurements.

The method may include, after the second measurement:
controlling the second auxiliary circuit into the closed state;
performing a third measurement of the output signal from the assembly;
establishing a weight of a user and the bending of a plate of the weighing device, based on the first, second, and third measurements.

With the third measurement, it is possible to ascertain a value algebraically for the weight and offset of the user on the scale in the front/rear direction and in the right/left direction.

The method may comprise, after the third measurement:
controlling the third auxiliary circuit into the closed state;
performing a fourth measurement of the output signal from the assembly;
establishing the weight, front-rear offset, right-left offset of a user and the torsion of a plate of the weighing device, based on the first, second, third, and fourth measurements.

With the fourth measurement, it is possible to estimate the torsion of the plate which occurs during the measurements. Estimating the torsion can improve the precision of the weight and offsets. Estimating the torsion can also reduce the requirements for plate rigidity without impacting the precision of the weight and offsets.

The weight, front-rear offset, and right-left offset can be calculated by multiplying a vector, composed of the first, second, and third measurements, by a transition matrix.

The transition matrix can be obtained by a theoretical calculation.

The transition matrix can be obtained experimentally. This allows improving the precision of the transition matrix.

The weight may be displayed to a user.

The front-rear and/or right-left offset can allow at least one among: an interaction of the bathroom scale with a user, a cleaning of a ballistocardiography (BCG) signal, and/or an analysis of the user's balance on the bathroom scale.

The order of the measurements is of no particular importance.

The method described may further comprise a step of controlling an electronic system, using the offset information obtained. In this manner, the weighing device can be used as a controller of an electronic system. The electronic system may comprise the weighing device itself, a (separate) computer, or a game console.

The measurements made by the bathroom scale can be sent to a smartphone and/or a server. The user can thus access the measurements made by the bathroom scale, at a distance from the bathroom scale. Measurement tracking can be carried out.

BRIEF DESCRIPTION OF DRAWINGS

Other features, details and advantages will become apparent upon reading the detailed description below, and upon analyzing the accompanying drawings, in which:

FIG. 8A shows other variants of the basic wiring diagram of the weighing device of FIG. 3;

FIG. 14 shows an example of a matrix calculation for obtaining the weight and the offsets;

DESCRIPTION OF EMBODIMENTS

In the various figures, the same references designate identical or similar elements.

1. General Shape of the Bathroom Scale

Figure 1:
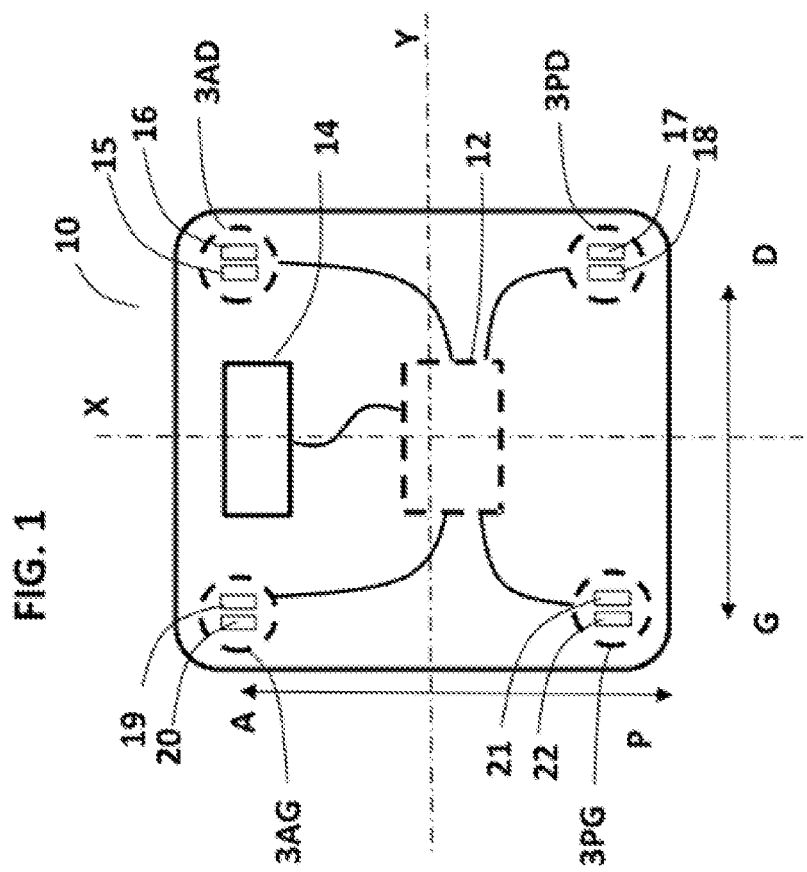
FIG. 1 is a general view of the weighing device according to the invention, viewed from above.

FIG. 1 shows an example of a weighing device 10 according to one embodiment of the invention.

In the illustrated example, this weighing device 10 is presented as an electronic bathroom scale, or personal scale, on which a user can position himself in order to measure his weight in particular.

The electronic bathroom scale 10 comprises a main body of generally rectangular or square shape and four feet respectively arranged near the four corners of the body, each foot comprising measurement means.

Alternatively, the scale could have a round or oval shape. In this case, the four feet are evenly distributed around the center axis of the bathroom scale, each foot comprising the measurement means.

Specifically, the left front foot comprises a left front load cell 3AG, the right front foot comprises a right front load cell 3AD, the left rear foot comprises a left rear load cell 3PG, and the right rear foot comprises a right rear load cell 3PD.

Figure 16:
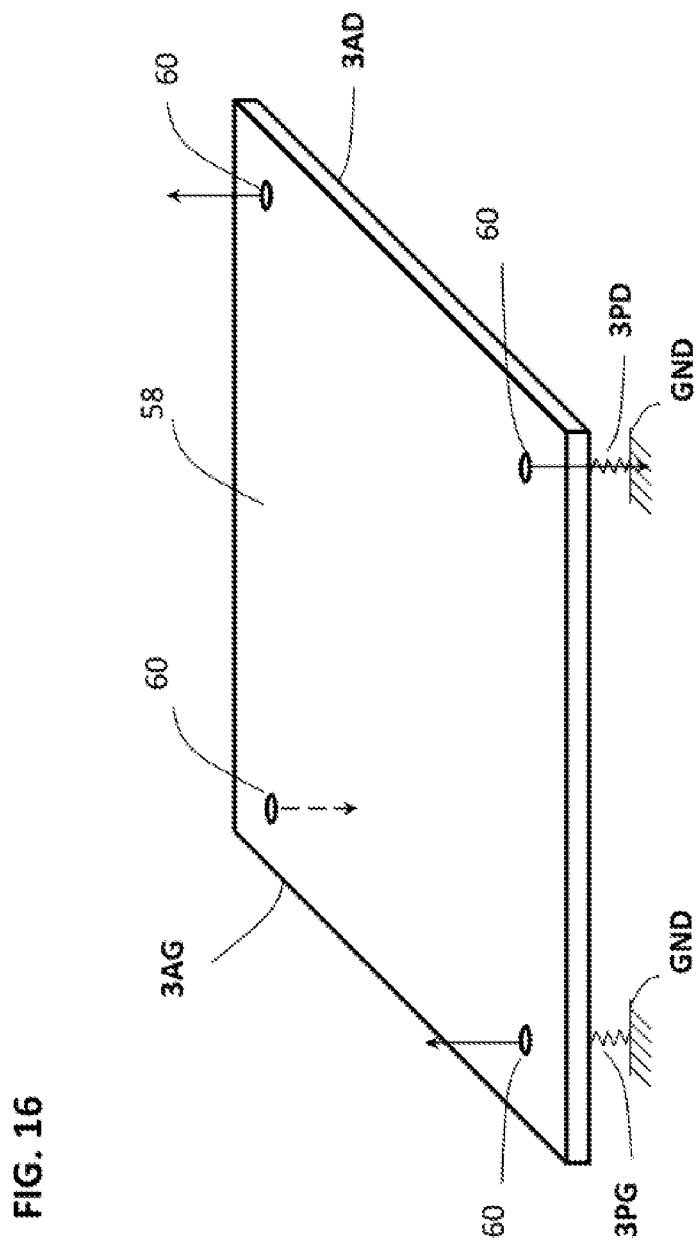
FIG. 16 schematically shows a perspective view of a sub-assembly of the weighing device of FIG. 1.

Note that, as can be seen in FIG. 16, the aforementioned load cells are arranged on a plate 58 provided in the electronic bathroom scale 10. Each load cell extends between a point of contact 60 with the plate 58, and the ground GND. Thus, each load cell performs a measurement relative to the main plane of extension of the plate 58. The plate 58 directly takes the weight of the user. In one embodiment, the plate 58 is the plate the user positions himself upon.

In FIG. 1, the front-rear direction is referenced by the X axis, the letter A designating the front and the letter P designating the rear, while the right-left direction is referenced by the Y axis, extending between the left side denoted G and the right side denoted D.

With regard to the load cells already mentioned, load cells comprising two strain gauges of known type are preferably chosen, in particular gauges comprising a first element whose resistance increases under the effect of vertical compression applied to the foot in question and a second element whose resistance decreases under the effect of said vertical compression.

In the example illustrated here, the right front load cell 3AD comprises such a first element called the first right front resistor 15, and such a second element called the second right front resistor 16.

Similarly, the right rear load cell 3PD comprises such a first element called the first right rear resistor 17, and such a second element called the second right rear resistor 18.

Likewise for the left side, the left front load cell 3AG comprises such a first element called the first left front resistor 19, and such a second element called the second left front resistor 20.

Finally, the left rear load cell 3PG comprises such a first element called the first left rear resistor 21, and such a second element called the second left rear resistor 22.

"Neighbors" means two feet or load cells that share a "front/rear" or "left/right" characteristic. For example, the neighbors of load cell 3AG are the load cells 3AD and 3PG. In an architecture with four feet or load cells, only the feet or load cells diagonally across from each other are not neighbors.

The electronic bathroom scale 10 further comprises an electronic control unit 12 and a display 14.

Figure 2:
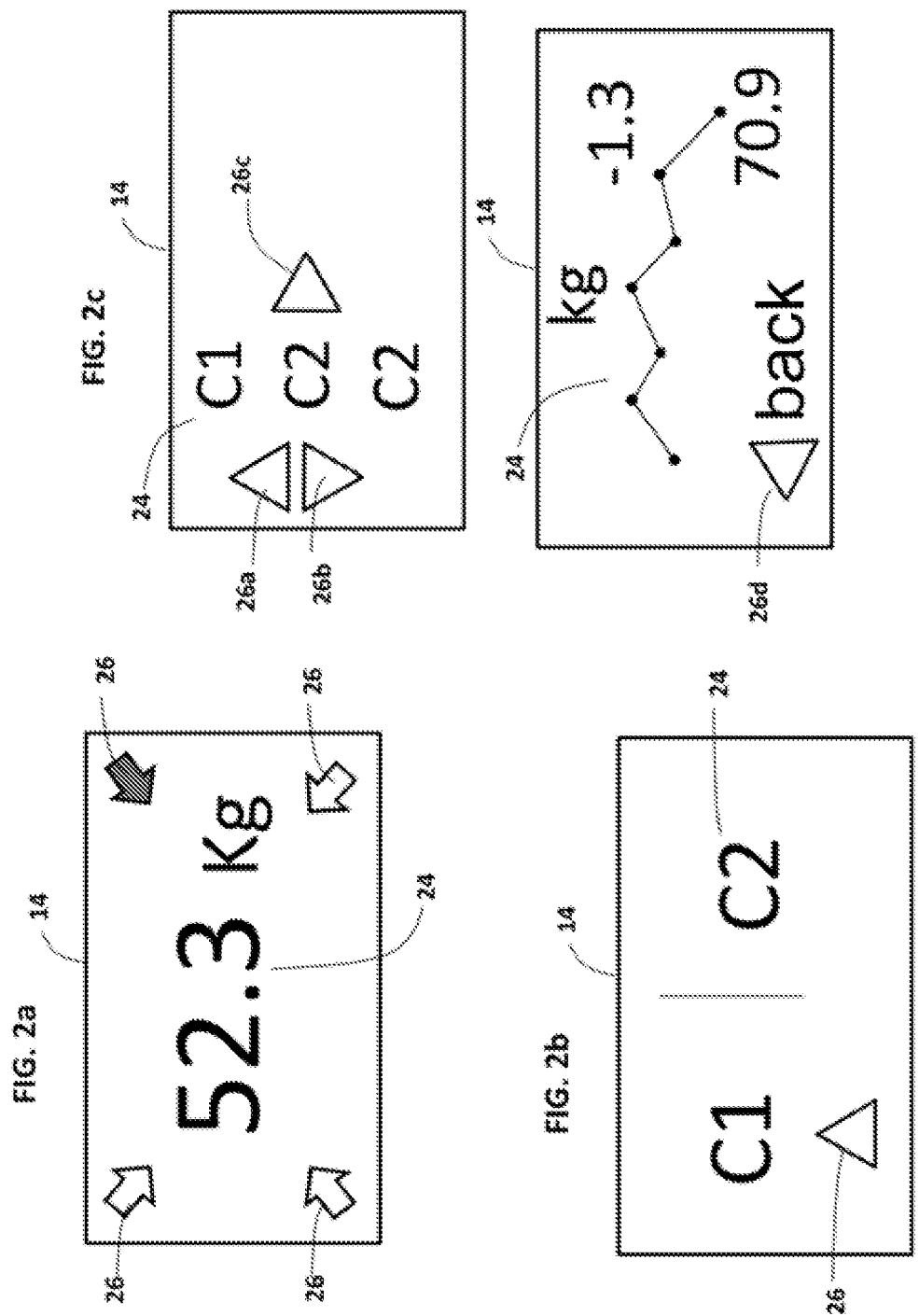
FIG. 2a shows a first display on a display of the weighing device of FIG. 1.
FIG. 2b shows a second display on the display of the weighing device of FIG. 1.
FIG. 2c shows a third display on the display of the weighing device of FIG. 1.

As shown in FIGS. 2a to 2c, the display 14 can display information 24, for example the estimated weight for the object or the name of the user present on the bathroom scale 10. In addition, the display 14 may display one or more indicators 26. The function of these indicators is to allow the user to interact with the bathroom scale according to a positional offset relative to an ideal centered position in which the forces are distributed substantially evenly over the four feet of the bathroom scale.

In the example of FIG. 2a, the display 14 displays the estimated weight 24 for the object or user present on the bathroom scale 10. The display shows four indicators 26, in the form of arrows. The indicators can indicate to the user on the bathroom scale the direction to lean in order to achieve the ideal centered position.

In the example of FIG. 2b, the display shows two options C1, C2. The options may for example be two different users, or two answers to a previously displayed question. The display shows an indicator 26, to allow the user to select among the two options via an offset in the right/left direction. The user will be able to lean to the right or to the left to change his selection.

In the example of FIG. 2c, the display shows a list of options C1, C2, C3. The list can consist of various functionalities of the scale, for example displaying the weather forecast, displaying a weighing history, or accessing the settings. The list may also be a plurality of possible answers to a question previously displayed.

The display then includes "forward" 26a and "back" 26b indicators, to allow the user to navigate through the options. The user will be able to lean forward to move up the list, and backward to move down.

The display also includes "right" 26c and "left" 26d indicators to allow the user to select an option or return to the list. The user will be able to lean to the right to select an option, or to the left to go back.

For each of the examples described above, an indicator can be activated to indicate to the user the direction to follow in order to correct the observed offset, or to navigate and select among the options. Activation of the indicator may consist of making it flash, turning it on while the others remain off, moving it within the display, or any other manner.

Of course, other types of displays which allow displaying information and interacting with the bathroom scale according to the offset can be implemented.

2. Wheatstone Bridge

Figure 3:
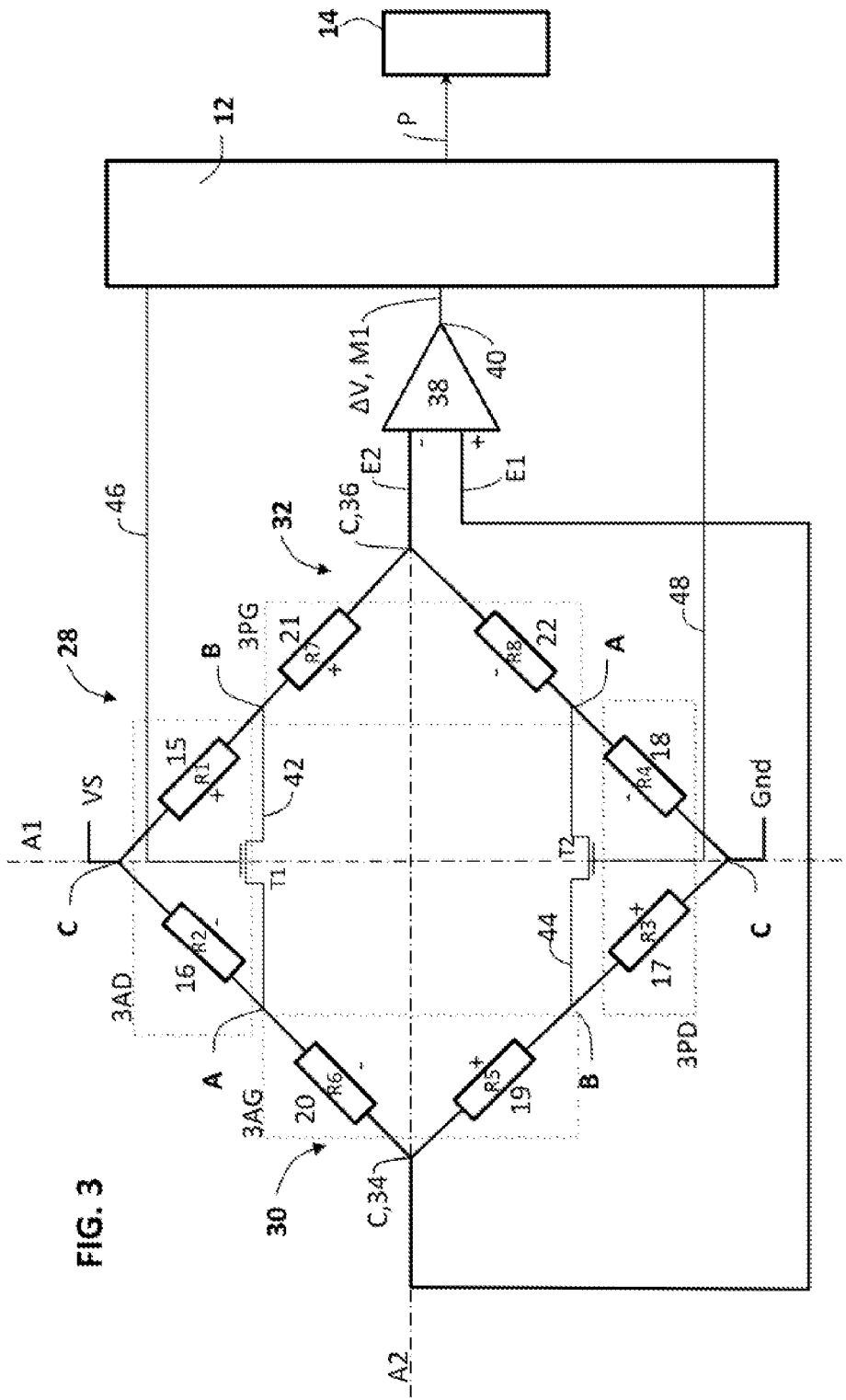
FIG. 3 shows a first embodiment of the basic wiring diagram of the weighing device of FIG. 1, in a first mode of operation.

Referring to FIG. 3, a basic wiring diagram of the bathroom scale comprises a Wheatstone bridge type of assembly 28, which combines the resistors 15 to 22 of the four load cells.

Each of the resistors 15-22 respectively has a resistance value denoted R1-R8. In the example illustrated here, the odd resistors, or resistors with positive sensitivity (hereinafter positive resistors), increase with the vertical compressive force applied to the feet, while conversely the even resistors, or resistors with negative sensitivity (hereinafter negative resistors), decrease with the force applied.

In a typical example, resistors with the same nominal value are chosen, for example 500 ohms or 1 kiloohm (1 kΩ).

In addition, odd resistors define a negative pole A of the load cell, and even resistors define a positive pole B. A third pole C separates the even and odd resistors of each load cell. In other words, pole C is the midpoint of the load cell.

In the Wheatstone bridge type of assembly 28, the negative poles A of the even resistors are joined together and the negative poles B of the odd resistors are joined together to form a quadrilateral having ends at the four poles C of the load cells.

Furthermore, two opposite poles C in the quadrilateral are respectively connected to a reference voltage Vs and a ground potential GND. Thus, the Wheatstone bridge type of assembly 28 defines a first branch 30 and a second branch 32, mounted in parallel between the reference voltage Vs and the ground potential GND.

The reference voltage Vs comes from a voltage source stabilized at a constant predetermined value, for example 2.8 V in the example considered. Alternatively, the assembly could also be powered by a source of current.

In the example illustrated, the first branch 30 connects, in series:
the reference voltage Vs to pole C of the right front load cell 3AD;
the negative pole A of the right front load cell 3AD to the negative pole A of the left front load cell 3AG;
the positive pole B of the left front load cell 3AG to the positive pole B of the right rear load cell 3PD; and
pole C of the right rear load cell 3PD to the ground potential.

Similarly, the second branch 32 connects, in series:
the reference voltage Vs to pole C of the right front load cell 3AD;
the positive pole B of the right front load cell 3AD to the positive pole B of the left rear load cell 3PG;
the negative pole A of the left rear load cell 3PG to the negative pole A of the right rear load cell 3PD; and
pole C of the right rear load cell 3PD to the ground potential.

The two remaining poles C, not connected to the reference voltage or to the ground potential, define intermediate points 34 and 36. The respective voltages present at the first and second intermediate points are measured, paying particular attention to the potential difference between these two intermediate points, as will be seen below.

As illustrated, the first and second intermediate points 34, 36 are defined by the poles C of the left front 3AG and left rear 3PG load cells, respectively.

Note that the load cells could be mounted differently than the example shown. A pole C of any load cell could be connected to the reference voltage, to the ground potential, or could form one of the intermediate points. Nevertheless, the following constraints will be satisfied:
each of the two branches 30, 32 has the same number of positive resistors and negative resistors;
the intermediate points 34, 36 separate the negative resistors and the positive resistors, of each of the branches.

It thus appears possible to define a first axis of symmetry A1 and a second axis of symmetry A2.

The first axis of symmetry A1 passes through the connection point of the reference voltage and the connection point of the ground potential and comprises the first branch 30 on the one hand and the second branch 32 on the other hand.

The second axis of symmetry A2 passes through the first and second intermediate points 34, 36 and comprises the negative resistors of the first branch 30 and the positive resistors of the second branch 32 on the one hand, and the positive resistors of the first branch 30 and the negative resistors of the second branch 32 on the other hand.

The first and second intermediate points 34, 36 are connected to an amplifier 38, whose role is to amplify the potential difference between the two intermediate points, and to deliver these amplified values from an output 40 connected to the control unit 12.

The voltage read from the first intermediate point is denoted Ed1, the voltage read from the second intermediate point is denoted Ed2, the voltage read at the output of the amplifier 38, which is the output signal, is denoted ΔV. We then have the equation $\Delta V = G(Ed1 - Ed2)$, G being the gain of the amplifier.

The assembly described above then makes it possible to mount the four load cells in a single Wheatstone bridge, and only requires one amplifier. The number of assembly components and the energy required to perform a measurement of an output signal are reduced, particularly in comparison to document WO2014/013208 where two Wheatstone bridges are associated with two amplifiers.

3. Auxiliary Circuits

Furthermore, the Wheatstone bridge type of assembly 28 comprises a first auxiliary circuit 42. As illustrated, the first auxiliary circuit 42 is connected to the negative pole A of the right front load cell 3AD and to the positive pole B of the right rear load cell 3AD.

One will note that the first auxiliary circuit 42 is symmetrical relative to the first axis of symmetry A1. The assembly is thus balanced. This prevents saturation of the amplifier 38.

The first auxiliary circuit 42 here comprises a transistor T1. When transistor T1 is open (also called "at rest" or "OFF"), the impedance of the auxiliary circuit is infinite, and no current flows through the auxiliary circuit. The output signal ΔV is not influenced by the first auxiliary circuit.

Figure 4:
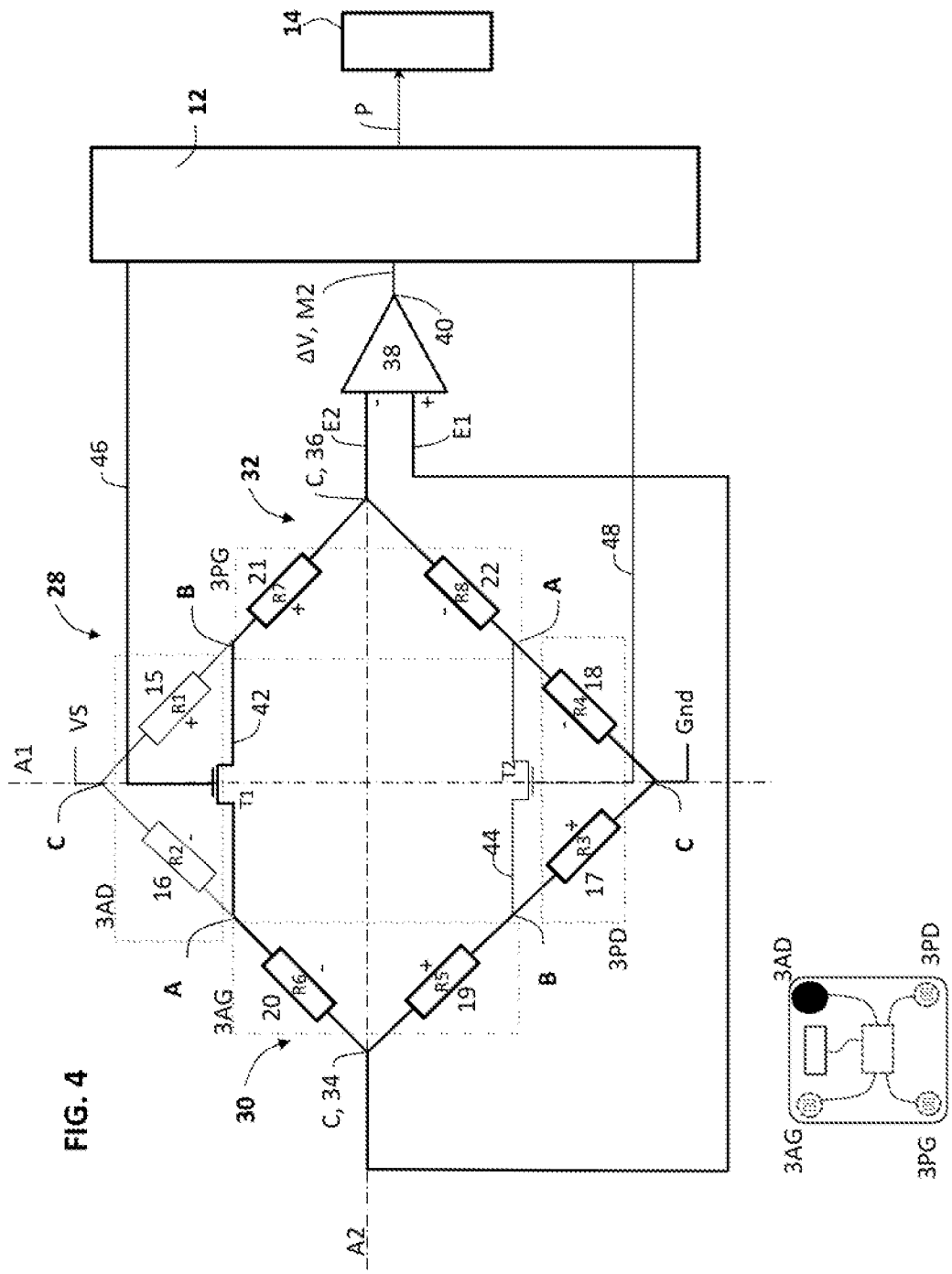
FIG. 4 shows the wiring diagram of FIG. 3 in a second mode of operation.

On the other hand, when transistor T1 is closed, it becomes equivalent to a wire. Then, as can be seen in FIG. 4, a short circuit forms between the positive B and negative A poles of the right front load cell 3AD. Then, the assembly comprises a short circuit which cancels out the contribution of resistors 15 and 16 of the right front load cell 3AD. The resistors do not contribute to the output signal ΔV. The rest of the bridge is supplied with ¾ of the reference voltage Vs.

Of course, other types of switches could be considered for controlling the auxiliary circuit or auxiliary circuits described. For example, the switch can be an opto-isolator. The use of an opto-isolator makes it possible to decouple the electrical measurement circuit from the control circuit, and therefore makes it possible to avoid parasitic effects related to the control circuit.

In addition, the Wheatstone bridge type of assembly 28 here comprises a second auxiliary circuit 44. As illustrated, the second auxiliary circuit is connected to the positive pole B of the right rear load cell 3PD, and to the negative pole A of the right rear load cell 3PD.

One will note that, in the same manner as the first auxiliary circuit 42, the second auxiliary circuit 44 is symmetrical relative to the first axis of symmetry A1.

Figure 5:
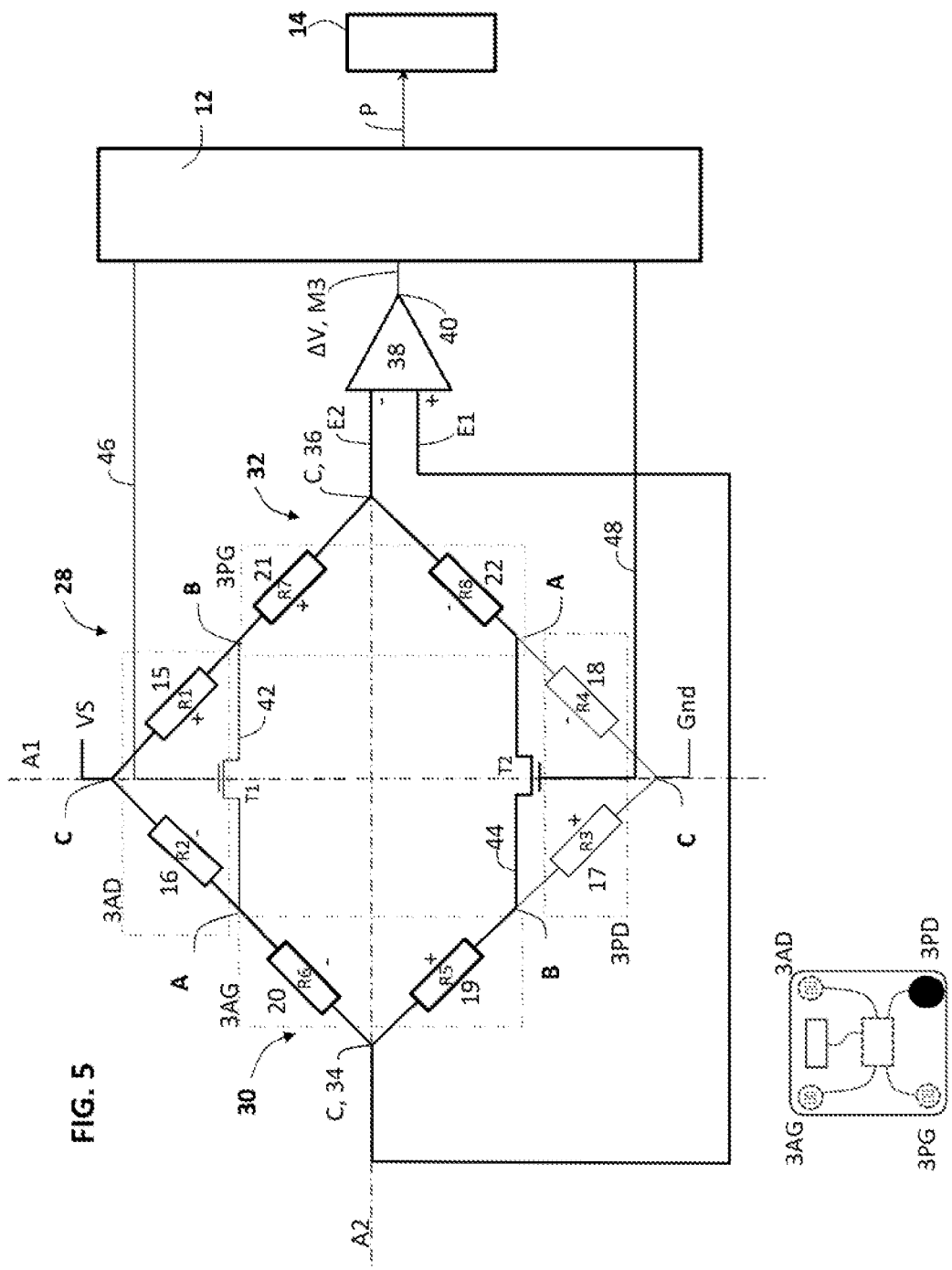
FIG. 5 shows the wiring diagram of FIG. 3 in a third mode of operation.

The second auxiliary circuit 44 also includes a transistor T2. As with the first transistor T1, when transistor T2 is open, the output signal ΔV is not influenced by the second auxiliary circuit 44. When transistor T2 is closed, and as illustrated in FIG. 5, a short circuit is formed between the positive B and negative A poles of the right rear load cell 3AD, and the resistors 17 and 18 of the right rear load cell 3PD do not contribute to the output signal ΔV. The rest of the bridge is supplied with ¾ of the reference voltage Vs.

Each of the two auxiliary circuits 42, 44 makes it possible to short-circuit the two resistors of load cells belonging to two neighboring feet in the bathroom scale and to cancel out their contribution to the output signal ΔV. In fact, in FIG. 3, the load cells concerned are the two load cells on the right side of the bathroom scale 10. The auxiliary circuits can thus make it possible to ascertain values corresponding to the weight, to the offset in the right/left direction, and to the offset in the front/rear direction of the user on the bathroom scale.

To do this, the electronic control unit 12 independently controls the activation or deactivation of transistors T1 and T2 by control lines 46 and 48.

The electronic control unit 12 can then perform a first measurement M1 of the output signal ΔV with the two transistors in the open state. All load cells contribute substantially equally to the output signal ΔV. Measurement M1 is then a weight measurement influenced by the user's right/left and front/rear offsets on the scale.

Furthermore, as illustrated in FIG. 4, the control unit 12 can perform a second measurement M2 of the output signal ΔV with the first transistor T1 in the closed state. The right front load cell 3AD no longer contributes to the output signal ΔV. Measurement M2 is then a weight measurement particularly influenced by the left and rear load cells.

Finally, as illustrated in FIG. 5, the control unit 12 can perform a third measurement M3 of the output signal ΔV with the second transistor T2 in the closed state. The right rear load cell 3PD no longer contributes to the output signal ΔV. Measurement M3 is then is a weight measurement particularly influenced by the left and front load cells.

Each of the measurements M1, M2, M3 corresponds to linear combinations of the weight and imbalances in the right/left and front/rear direction of the user on the scale. In the control unit 12, the vector formed by measurements M1, M2, M3 can then be multiplied by a transition matrix A to obtain values corresponding to the weight P, to the front/rear offset A/P, and to the right/left offset D/G.

As can be seen in FIG. 14, the matrix A is formed by coefficients A1-A9. The coefficients can be multiplied by measurements M1, M2, and M3. The value of each of the coefficients can be determined by a theoretical calculation. However, the coefficients can also be determined experimentally, to improve the precision of the transition matrix A. In practice, the experimental matrix A can be viewed as the sum of the theoretical matrix A and a disruption matrix.

The weight P can be transmitted to the display 14. The displayed weight is then cleared of disruptions due to an offset of the user on the bathroom scale.

In addition, a ballistocardiography (BCG) signal, measured by the scale, can be cleaned of components related to movements of the user in the right/left and front/rear direction. The BCG signal is therefore improved.

The offset values can also allow the user to interact with the bathroom scale 10, in particular by means of the display 14.

The offset values can also be used to study the imbalance of the user on the scale.

4. Variants of Auxiliary Circuits

Figure 6:
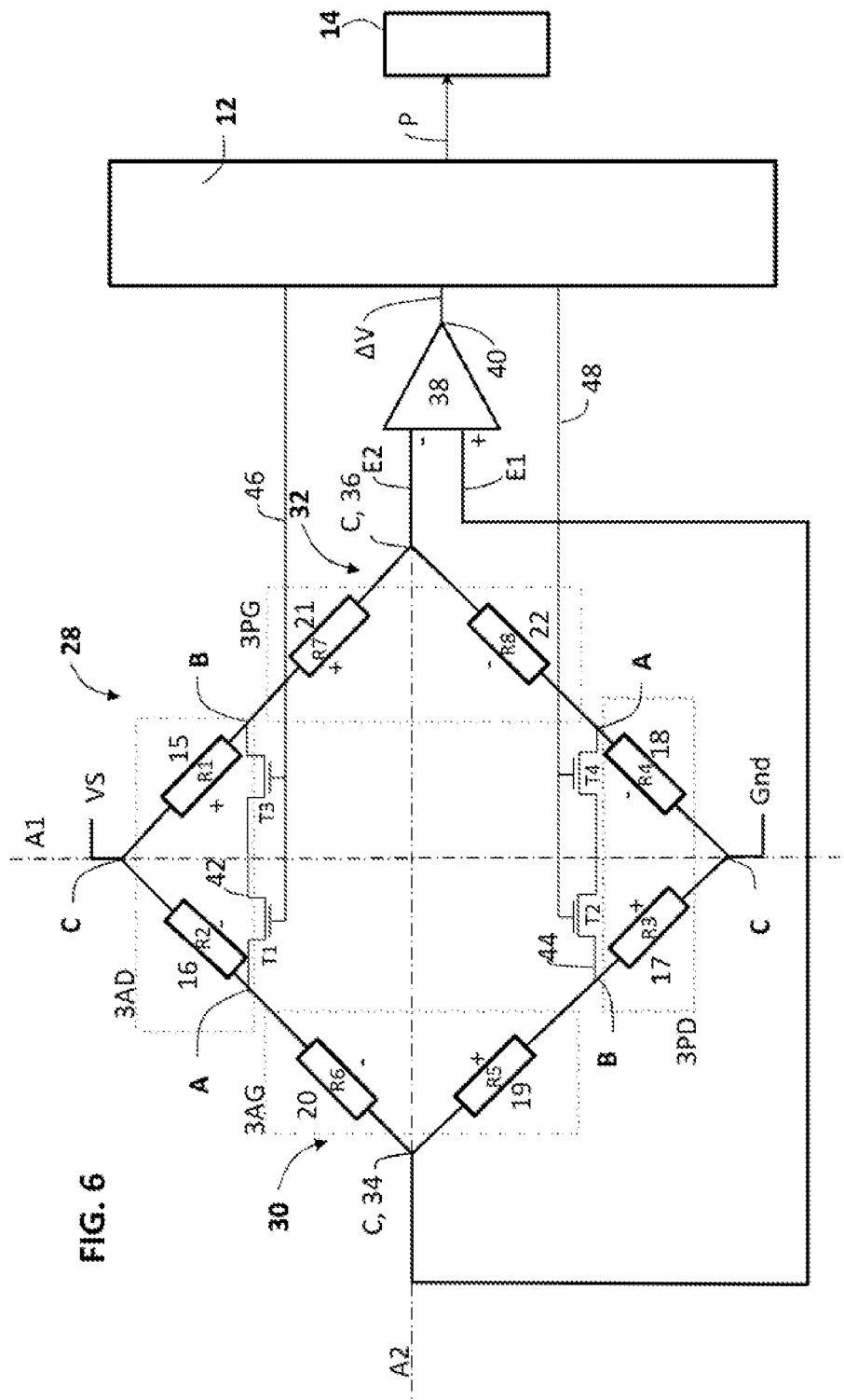
FIG. 6 shows a variant of the basic wiring diagram of the weighing device of FIG. 3.

FIG. 6 also illustrates an assembly 28 comprising two auxiliary circuits 42, 44. Here, the first auxiliary circuit 42 comprises a pair of transistors T1, T3 controlled simultaneously by control line 46. Likewise, the second auxiliary circuit 44 comprises a pair of transistors T2, T4 controlled simultaneously by control line 48. As a transistor is not perfectly symmetrical, the use of two transistors per auxiliary circuit allows better symmetry of the assembly 28.

Note that one among the first auxiliary circuit 42 and the second auxiliary circuit 44 could comprise two transistors and the other among the first auxiliary circuit 42 and the second auxiliary circuit 44 could comprise one transistor.

Figure 7:
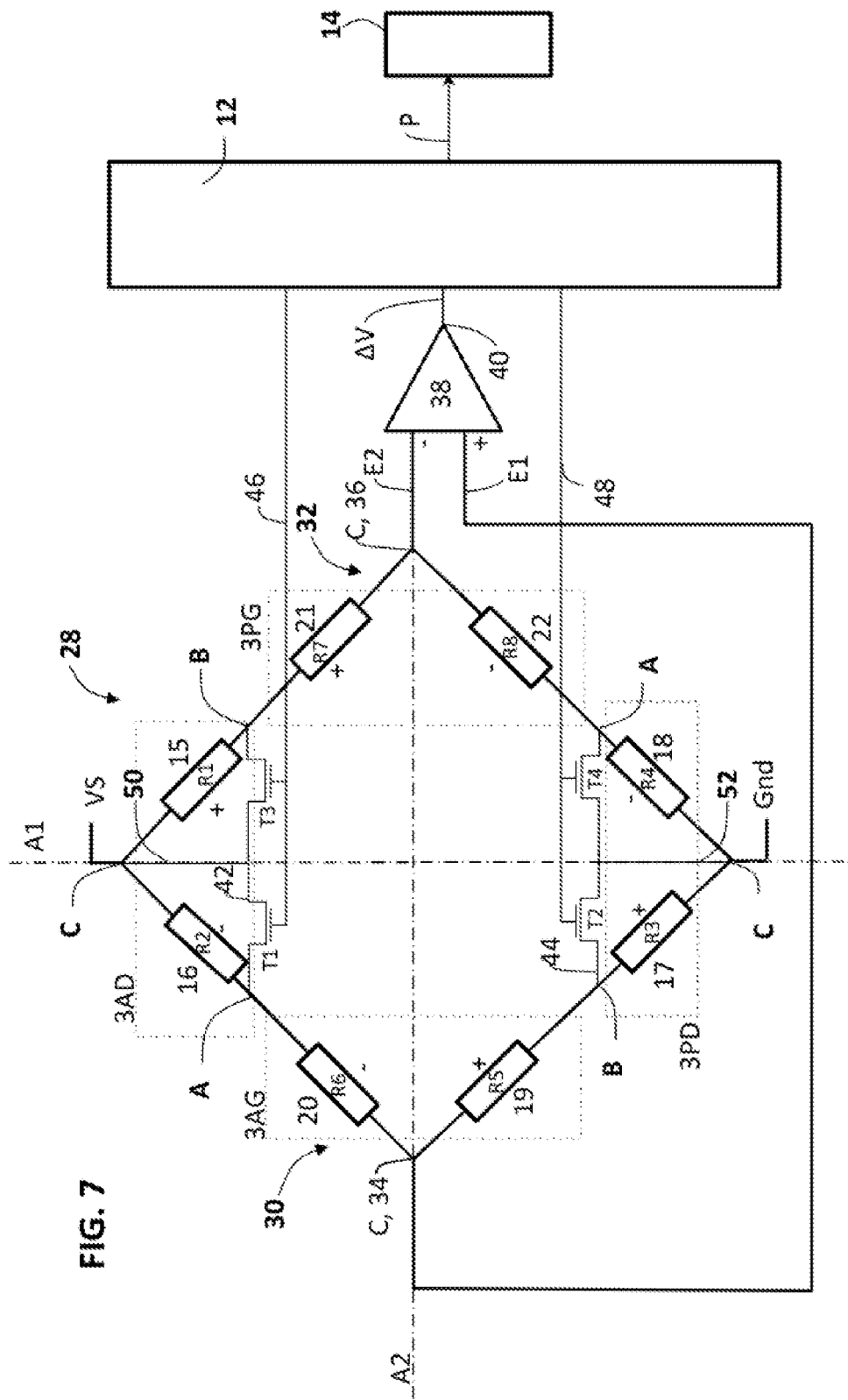
FIG. 7 shows another variant of the basic wiring diagram of the weighing device of FIG. 3.

FIG. 7 illustrates two auxiliary circuits 42, 44, each comprising a pair of transistors T1, T3 and T2, T4. Furthermore, an additional branch 50 connects the first auxiliary circuit 42, between two transistors T1, T3, to the reference voltage Vs. Another additional branch 52 connects the second auxiliary circuit 44 to the ground potential. The additional branches 50, 52 make it possible to power the bridge assembly at the reference voltage Vs when the transistors of one or the other among the auxiliary circuits are controlled into the closed state. This configuration then makes it possible to increase the value of the output signal ΔV, in particular enough to improve the signal-to-noise ratio (SNR).

Figure 8A:
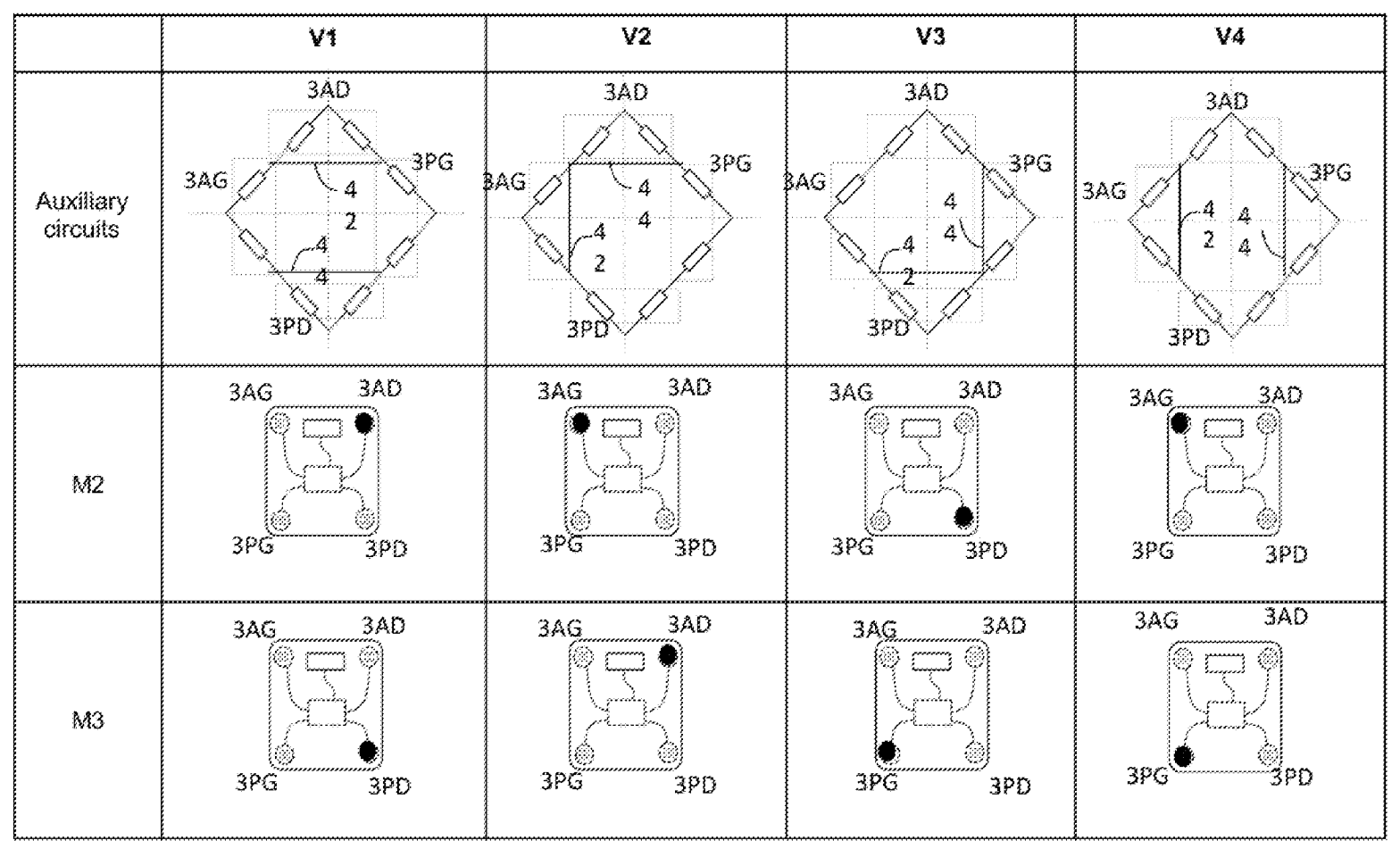

The table of FIG. 8A illustrates alternative positions of the auxiliary circuits 42, 44. Each variant can comprise auxiliary circuits with one or two transistors, or comprise an additional branch.

Variant V1 corresponds to the assembly described above. Advantageously, the arrangement of the first and second auxiliary circuits 42, 44 on the load cells linked to the reference voltage and to the ground potential makes it possible to limit the effects of temperature.

In variant V2, the first auxiliary circuit 42 makes it possible to short-circuit the left front load cell 3AG, for the second measurement M2, and the second auxiliary circuit makes it possible to short-circuit the right front load cell 3AD, for the third measurement M3.

Variant V3 comprises a first auxiliary circuit 42 making it possible to short-circuit the right rear load cell 3PD, for the second measurement M2, and a second auxiliary circuit 44 making it possible to short-circuit the left rear load cell 3PG, for the third measurement M3.

Variant V4 comprises a first auxiliary circuit 42 making it possible to short-circuit the left front load cell 3AG, for the second measurement M2, and a second auxiliary circuit 44 making it possible to short-circuit the left rear load cell 3PG, for the third measurement M3.

Note that in each of the variants V1, V2, V3, V4:
  each auxiliary circuit is symmetrical relative to axis A1 or A2, to avoid amplifier saturation;
  the first auxiliary circuits and second auxiliary circuits are arranged on the resistors of load cells belonging to two neighboring feet in the bathroom scale.

By satisfying these conditions, it appears possible to perform three measurements of the output signal ΔV to ascertain the weight P of a user, a front/rear offset A/P, and a right/left offset R/L.

Figure 8B:
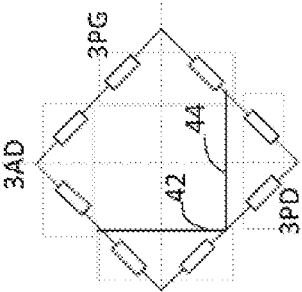
FIG. 8B shows other variants of the basic wiring diagram of the weighing device of FIG. 3.

In two other variants illustrated in the table of FIG. 8B, the first auxiliary circuits 42 and second auxiliary circuits 44 are arranged on the resistors of load cells belonging to two feet which are not neighboring, meaning two diagonally opposite feet. There are then two possible variants Vd1, Vd2: the left front 3AG and right rear 3DP load cells are short-circuited and the right front 3AD and left rear 3PG load cells are short-circuited.

In variant Vd1, the first auxiliary circuit 42 makes it possible to short-circuit the right front load cell 3AD, for the second measurement M2, and the second auxiliary circuit 44 makes it possible to short-circuit the left rear load cell 3PG, for the third measurement M3.

In variant Vd2, the first auxiliary circuit 42 makes it possible to short-circuit the left front load cell 3AG, for the second measurement M2, and the second auxiliary circuit 44 makes it possible to short-circuit the right rear load cell 3PD, for the third measurement M3.

Note that in each of the variants Vd1, Vd2, each auxiliary circuit 42, 44 is symmetrical relative to axis A1 or A2, to avoid amplifier saturation. By satisfying these conditions, it appears possible to carry out three measurements of the output signal ΔV to obtain the weight and information about torsion of the plate. More information about the torsion will be given below.

5. Offloaded Auxiliary Circuit

Figure 9:
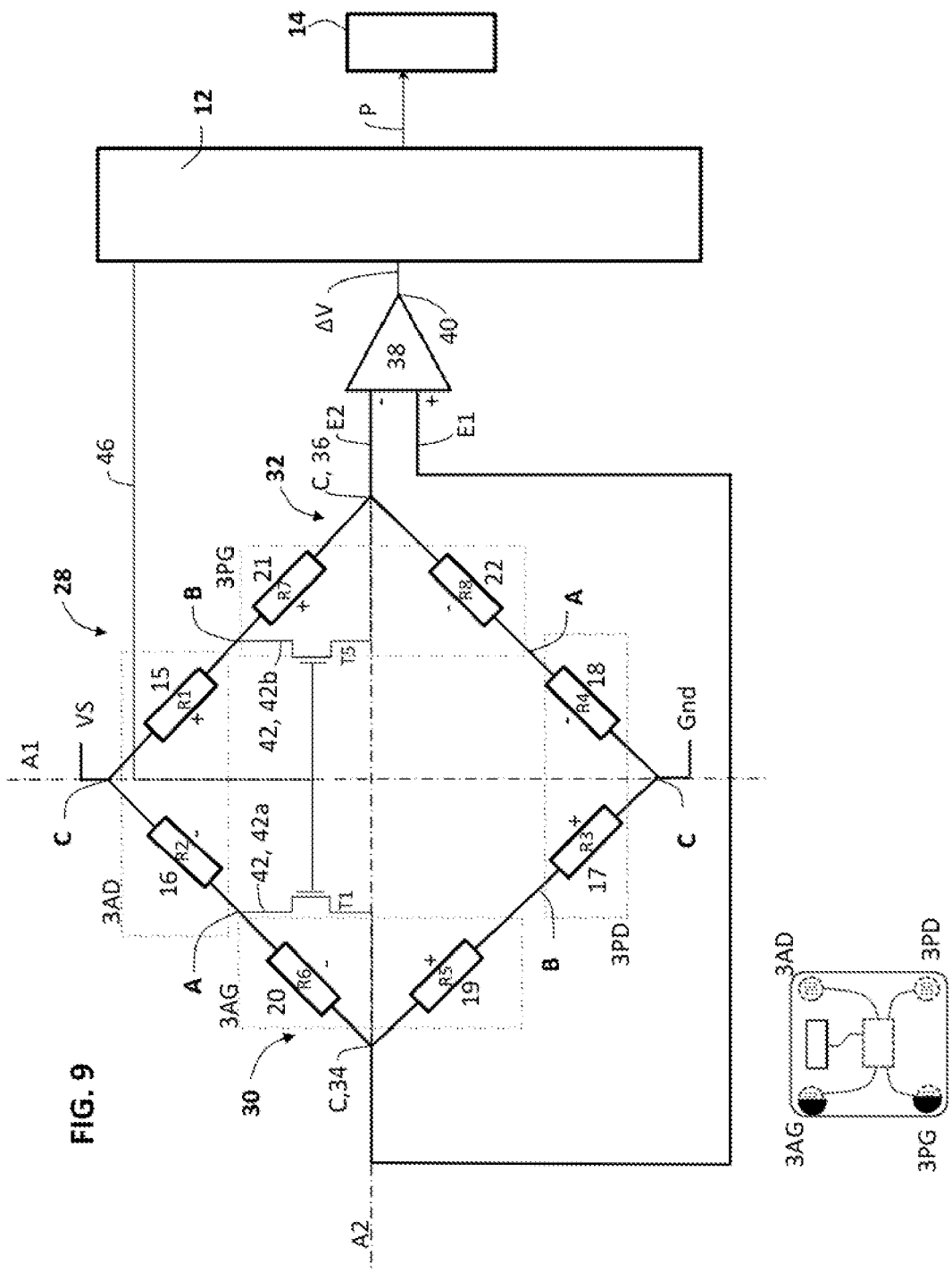
FIG. 9 shows a second embodiment of the basic wiring diagram of the weighing device of FIG. 1.

FIG. 9 illustrates an auxiliary circuit 42 comprising two parts 42a, 42b. As illustrated, the first part 42a is connected to the negative pole A of the left front load cell 3AG and to pole C of the left front load cell 3AG. The second part 42b is connected to the positive pole B of the left rear load cell 3PG and to pole C of the left rear load cell 3PG.

Note that this two-part auxiliary circuit 42 is symmetrical relative to axis A1. In addition, note that the first part 42a and the second part 42b of the auxiliary circuit 42 short-circuit two resistors belonging to load cells of two neighboring feet in the bathroom scale, in this case the left front and left rear feet.

Each part 42a, 42b of the auxiliary circuit 42 comprises a transistor T1, T5. The two transistors are simultaneously controlled into the closed state by the control unit 12 via control line 44.

In this closed state, resistor 20 of left front load cell 3AG and resistor 21 of left rear load cell 3PG are each short-circuited across their terminals. The influence of the two load cells at the left side of the bathroom scale on the output signal ΔV, during the second measurement M2, is then halved. Such a measurement M2 then makes it possible to ascertain an offset in the right/left direction.

Figure 10:
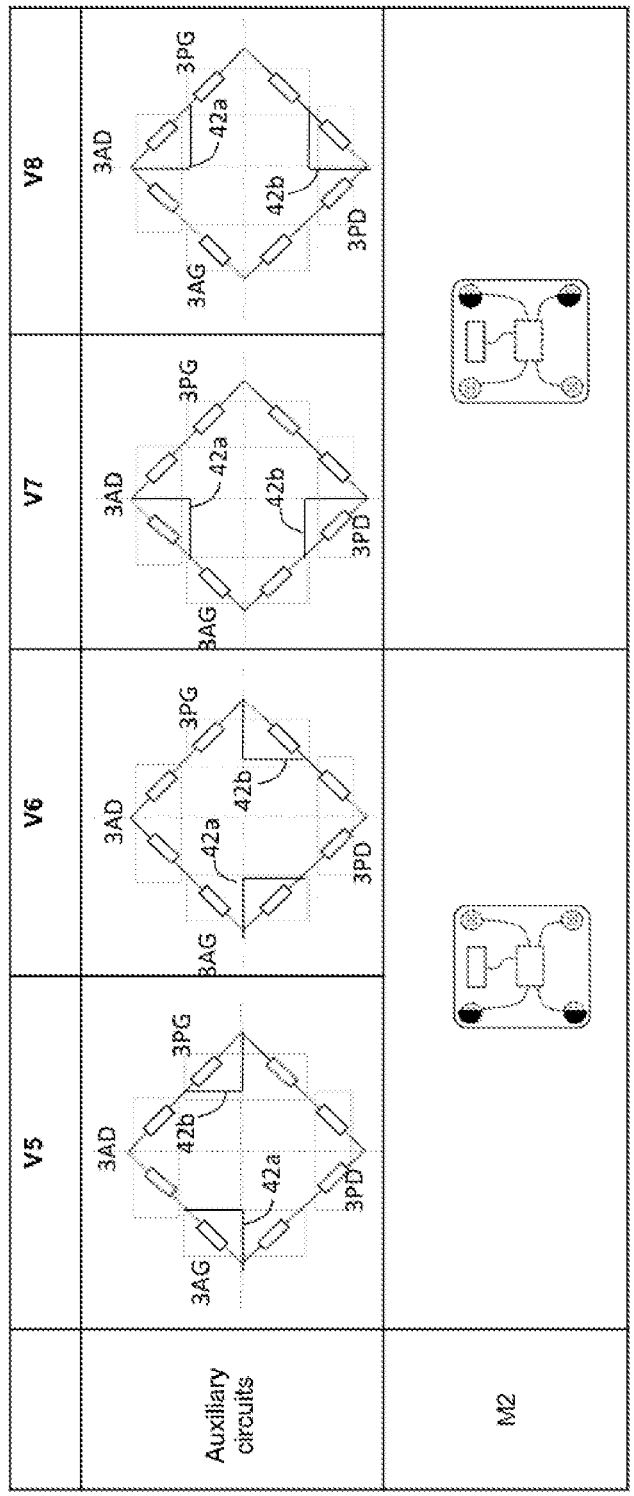
FIG. 10 shows variants of the basic wiring diagram of the weighing device of FIG. 9.

The table in FIG. 10 illustrates variants of two-part auxiliary circuits 42 allowing the second measurement M2 to be carried out.

Variant V5 corresponds to the example in FIG. 9.

Variant V6 allows short-circuiting resistor 19 of the left front load cell 3AG and short-circuiting resistor 22 of the left rear load cell 3PG.

Variant V7 allows short-circuiting resistor R2 of the right front load cell 3AD and resistor R3 of the right rear load cell 3PD.

Finally, variant V8 allows short-circuiting resistor 15 of the right front load cell 3AD and resistor 18 of the right rear load cell 3PD.

Note that each of variants V5 to V8 of the two-part auxiliary circuit 42 is symmetrical relative to axis A1 or axis A2. Furthermore, each part of the auxiliary circuit is designed to short-circuit two resistors belonging to two neighboring feet in the bathroom scale 10.

Also note that variants V5 to V8 all allow performing a measurement M2 which is particularly sensitive to an offset in the right/left direction.

Indeed, the arrangement of the two-part auxiliary circuit is limited by the condition of symmetry relative to the first or second axis of symmetry A1, A2. In order to arrange a two-part auxiliary circuit on a front resistor and on a rear resistor, it is necessary to swap the arrangement of the load cells in the assembly 28.

6. Second Auxiliary Circuit of an Offloaded Circuit

In order to perform a third measurement M3 on a two-part auxiliary circuit, it is possible to add a second auxiliary circuit 44 in any one of variants V5 to V8. It then appears possible to estimate the weight P of a user, a front/rear offset, and a right/left offset.

Figure 11:
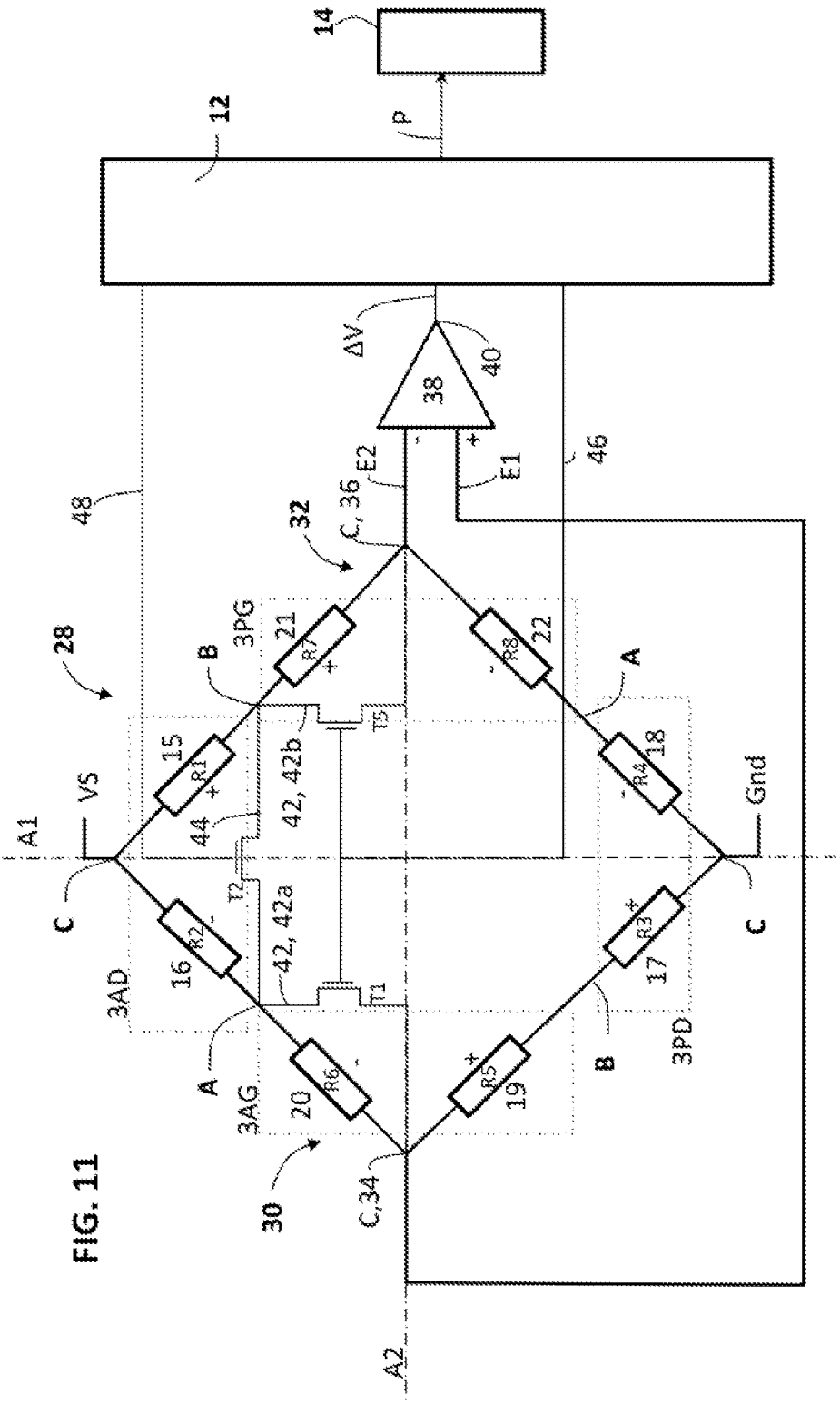
FIG. 11 shows a third embodiment of the basic wiring diagram of the weighing device of FIG. 1.

As can be seen in FIG. 11, the first auxiliary circuit 42 is analogous to variant V5 described above. The second auxiliary circuit 44 is connected to the negative pole A of the right front load cell 3AD on the one hand, and to the positive pole B of the right front load cell 3AD on the other hand. The second auxiliary circuit 44 is analogous to the first auxiliary circuit of variant V1 described above.

Note that the second auxiliary circuit is symmetrical relative to axis A1. In addition, the right front load cell 3AD, short-circuited by the second auxiliary circuit 44, is neighboring the left front 3AG and left rear 3PG load cells in the bathroom scale, which are (partially) short-circuited by the first two-part auxiliary circuit 42.

Alternatively, the second auxiliary circuit 44 can be any of the auxiliary circuits of variants V1 to V4. Note that in each of the possible combinations, at least one resistor short-circuited by the first auxiliary circuit 42 belongs to a load cell neighboring a resistor short-circuited by the second auxiliary circuit 44.

Figure 12:
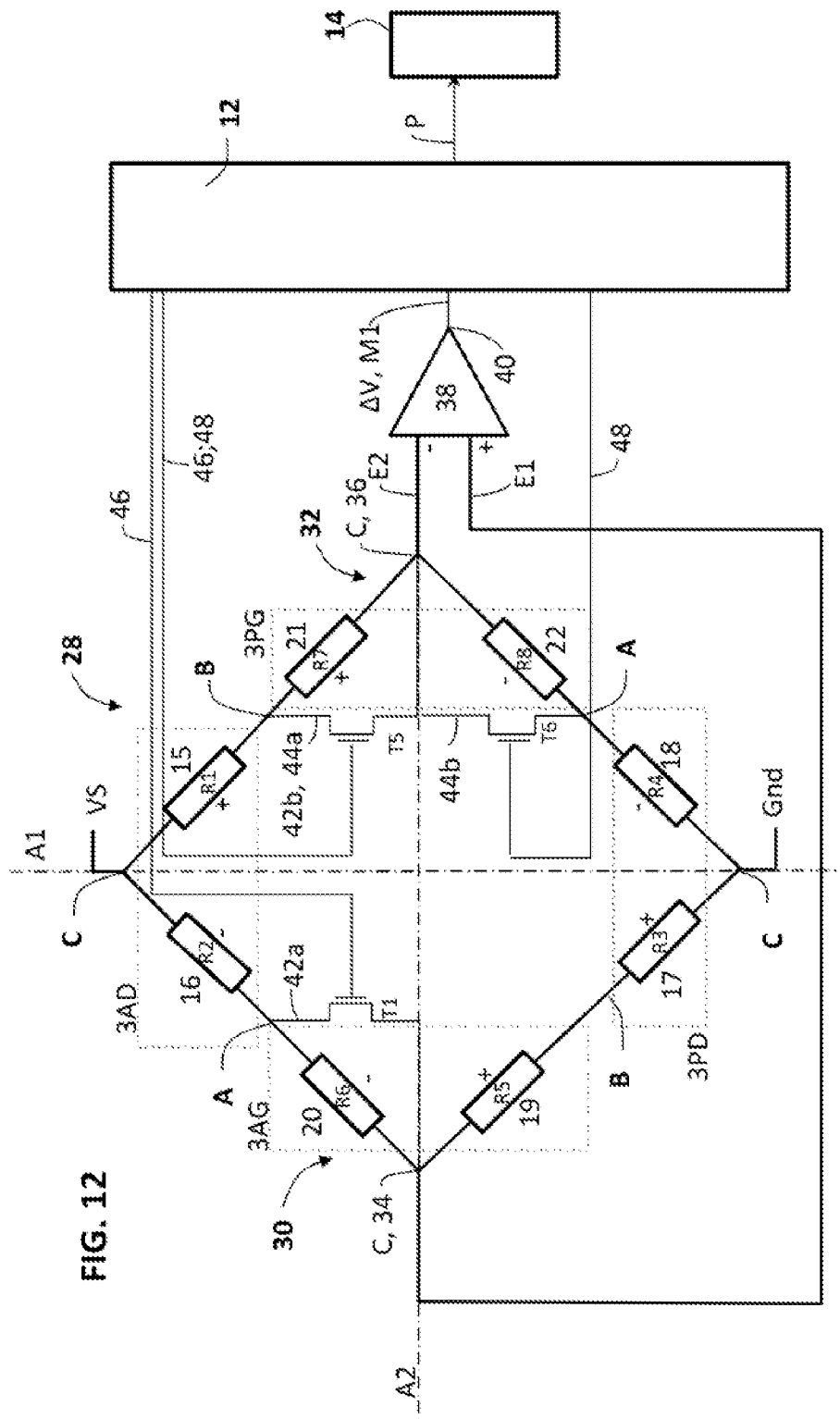
FIG. 12 shows a fourth embodiment of the basic wiring diagram of the weighing device of FIG. 1.

Furthermore, as illustrated in the example of FIG. 12, the second auxiliary circuit 44 can be in two parts, of which one part is shared with the first auxiliary circuit 42.

Here, the first auxiliary circuit 42 is analogous to variant V5 described above. The second auxiliary circuit comprises a first part 44a in common with the second part 42b of the first auxiliary circuit 42. The second part 44b of the second auxiliary circuit is connected to the negative pole A of the right rear load cell 3PD and to pole C of the left rear load cell 3PG, in order to short-circuit resistor 22.

Note that the second auxiliary circuit 44 is then symmetrical relative to axis A2. Also note that resistor 20, short-circuited by the first auxiliary circuit, belongs to the left front foot neighboring the left rear foot operated by the second auxiliary circuit 44.

Each part of the auxiliary circuit is controlled independently by a transistor T1, T5, T6. The second measurement M2 is carried out when the control unit 12 simultaneously closes transistors T1 and T5 of the first and second auxiliary circuits 42, 44. Then, measurement M2 is analogous to the two-part circuit of variant V5 described above. The third measurement M3 is performed by simultaneously controlling transistors T5 and T6 of the second and third auxiliary circuits 44, 54. Measurement M3 is then analogous to the third measurement M3 of variant V4.

It appears possible to conceive of other arrangements of the second auxiliary circuit 44, not shown. In order to ascertain the weight and the right/left and front/rear offsets, the condition must nevertheless be satisfied that at least one resistor short-circuited by the first auxiliary circuit and at least one resistor short-circuited by the second auxiliary circuit belong to two neighboring feet in the bathroom scale.

7. Supplemental Auxiliary Circuit

Figure 15A:
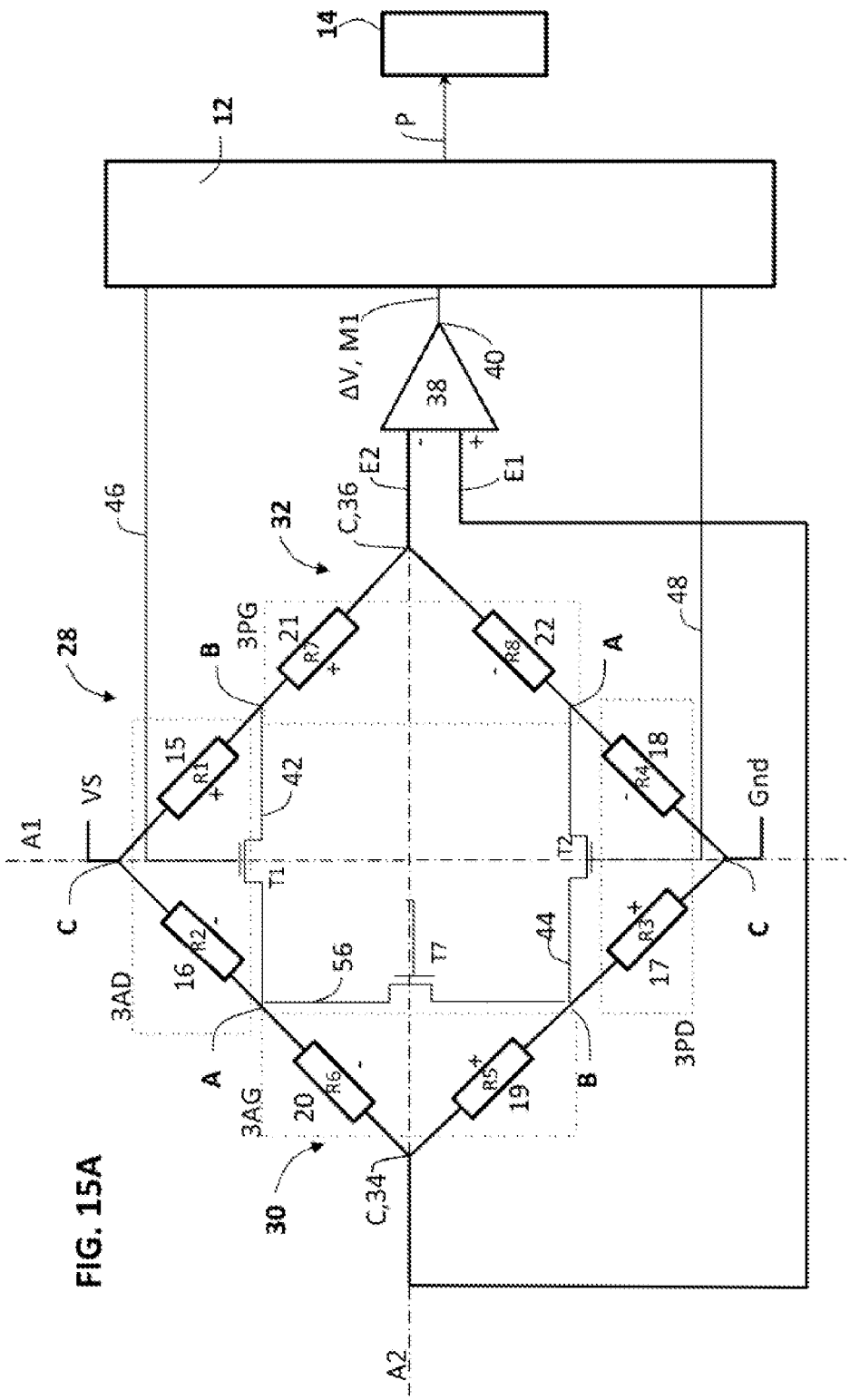
FIG. 15A shows a fifth embodiment of the basic wiring diagram of the weighing device of FIG. 1.

As can be seen in FIG. 15A, the Wheatstone bridge type of assembly 28 can also include a third auxiliary circuit 56. In the example illustrated, the third auxiliary circuit 56 (with a transistor T7) is connected between the negative pole A and the positive pole B of the left front load cell 3AG.

Note that here the third auxiliary circuit 56 is symmetrical relative to the axis of symmetry A2. The assembly 28 remains balanced. Indeed, the auxiliary circuits 42, 44, 56 each have symmetry relative to axis A1 or axis A2.

Similarly to the first and second auxiliary circuits 42, 44, the third auxiliary circuit 56 may include one or two transistors with or without an additional branch. Then, when the transistor(s) is/are open, the output signal ΔV is not influenced by the third auxiliary circuit 56. Conversely, when the transistor(s) is/are closed, a short circuit forms between the positive and negative poles of the left front load cell 3AG. Then, the assembly 28 comprises a short circuit which cancels out the contribution of resistors 19 and 20 of the left front load cell 3AG.

The first, second, and third auxiliary circuits 42, 44, 56 make it possible to short-circuit three of the four load cells of the bathroom scale 10. In the example of FIG. 15A, the three load cells concerned are the right and left front load cells 3AD, 3AG and the right rear load cell 3PD. The three auxiliary circuits 42, 44, 56 allow the introduction of a fourth measurement dimension. The fourth dimension can be used to ascertain the weight, the front/rear offset, the right/left offset, and a torsion value of the plate 58 on which the load cells are mounted.

Figure 15B:
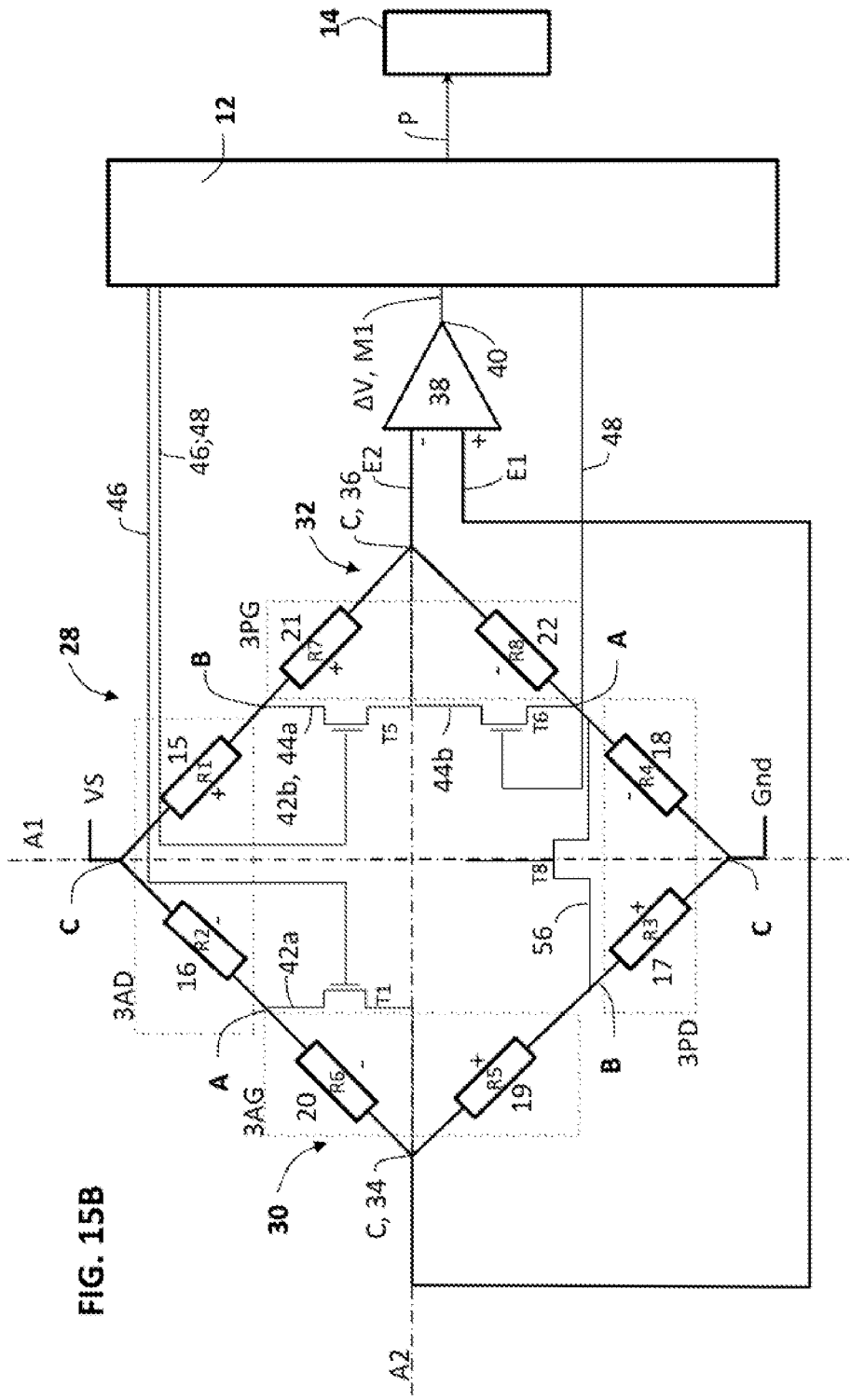
FIG. 15B shows a variant of the wiring diagram illustrated in FIG. 15.

FIG. 15B illustrates an alternative to the embodiment of FIG. 15A, in which one of the auxiliary circuits is offloaded (meaning in two parts which each short-circuit a resistor of a different load cell), as described in relation to FIG. 9. The circuit of FIG. 15a corresponds to that of FIG. 12, with the addition of a third auxiliary 56 which is identical to the auxiliary circuit 44 of FIGS. 2 to 5. Other variants combining three auxiliary circuits of which at least one is offloaded are possible, provided that the conditions of symmetry are satisfied and that each of the measurements M1, M2, M3, M4 contain information not present in the other measurements.

FIG. 16 illustrates more precisely what is meant by torsion of the plate 58. As illustrated, two load cells arranged diagonally opposite on the plate 58 measure loads of opposite direction to the other two load cells. Consequently, the plate 58 is subjected to torsion by the action of a couple of opposing forces. The torsion has the effect of creating a saddle-point type of deformation for the plate 58. Such torsion can contaminate the weight and offset values, especially when the plate 58 is not sufficiently rigid. Therefore, determining the torsion of the plate 58 can improve the accuracy of the weight and offsets while allowing the possibility of using a relatively flexible plate 58 in the bathroom scale 10.

To determine the torsion of the plate 58, the electronic control unit 12 can perform a fourth measurement M4 of the output signal ΔV with the transistor(s) of the third auxiliary circuit 56 in the closed state. Here, the left front load cell 3AG no longer contributes to the output signal ΔV. The fourth measurement M4 is therefore a weight measurement particularly influenced by the right and rear load cells.

Each of measurements M1 to M4 corresponds to linear and independent combinations of weight and imbalances. In the control unit 12, the vector formed by measurements M1 to M4 can be multiplied by a transition matrix A'. Matrix A' here has an additional dimension compared to matrix A. Here, matrix A' is formed by coefficients A1 to A16. The coefficients can be multiplied by measurements M1, M2, M3, and M4. Thus, the fourth measurement M4 makes it possible to determine, in addition to the weight and offset values, the torsion of the plate 58.

Note that the torsion can be displayed to the user. The user may for example be asked to correct his position in order to reduce the torsion of the plate 58. The display of the torsion may be done by displaying indicators 26, for example by displaying two opposite arrows (on the same diagonal). The user then knows that he must move one foot forward or backward and/or the other foot backward or forward, respectively, to better distribute the loads.

8. Alternatives to 3 Short Circuits

It appears possible to define alternative positions of the third auxiliary circuit 56. Each variant can also include alternative circuits with one or two transistors, with or without an additional branch.

However, the following conditions will be satisfied:
- each of the three auxiliary circuits 42, 44, 56 is symmetrical either relative to axis A1 or to axis A2, to avoid amplifier saturation;
- the three auxiliary circuits 42, 44, 56 are arranged so that three load cells out of the four are concerned by an auxiliary circuit.

9. Communication

The electronic control unit 12 may be provided with a communication module 100. The communication module allows the transmission and/or reception of wireless data.

Preferably, the communication module makes use of a local area network of the Bluetooth, Bluetooth Low-Energy (BLE), or Wi-Fi type. The communication module can then exchange data with a smartphone in proximity to the bathroom scale without requiring significant energy. The smartphone can also serve as a gateway for exchanging data with a remote server. The user can then access the data from the smartphone or from a computer connected to the server.

Alternatively, the communication module makes use of a cellular telecommunications network. The cellular communications network may for example be GSM, 3G, 4G, 5G, 4G-LTE. However, the communication module may also make use of a gateway connected to the cellular network. The gateway may in particular be a router, for example a Wi-Fi router connected to the cellular network. The communication module can then exchange data directly with the server. The user can access the data from the server, in particular on his smartphone or the computer.

The data received by the communication module may comprise information concerning the user, for example name, gender, and a weight history, ideas for questions to ask via the display, and/or the weather forecast for the day.

Furthermore, the communication module can send the weight, a loss of balance, the BCG signal, and/or the answers to the questions asked, to the smartphone and the server. The user can then access the data at any time.

10. Measurement Method

Figure 13:
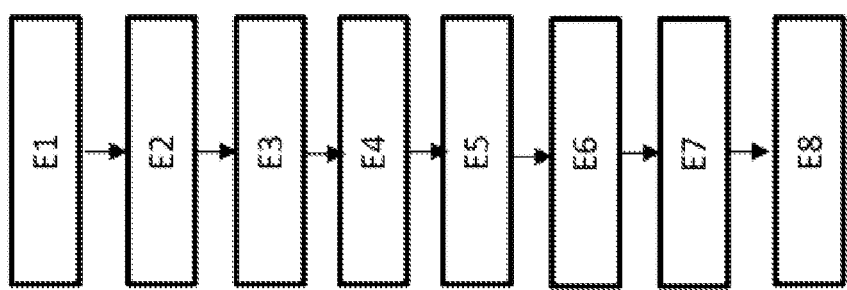
FIG. 13 shows a flowchart of the method implemented by the weighing device of FIG. 1.

FIG. 13 illustrates a method, implemented by the electronic control unit 12, for ascertaining the weight of a user and his offset on the bathroom scale.

The first step E1 consists of performing the first measurement M1 of the output signal ΔV when the four load cells have substantially equal contributions in the Wheatstone bridge. The transistors are then controlled into the open state. Measurement M1 is a measurement of the weight influenced by the user's right/left and front/rear offsets on the scale.

The second step E2 consists of controlling the first auxiliary circuit 42 into the closed state in order to short-circuit two resistors belonging to the same foot or two neighboring feet in the bathroom scale.

The third step E3 consists of performing the second measurement M2 of the output signal ΔV with the short circuit formed in step E2. Measurement M2 is then a linear combination of the weight with a greater contribution from front/rear or right/left offset.

Note that in the case where the assembly 28 has only one auxiliary circuit, measurement M1 can be transmitted to the display 14 and measurement M2 can be used to interact with the bathroom scale and/or to analyze the user's balance and/or to clean the BCG signal in the right/left direction or the front/rear direction.

Where appropriate, step E4 consists of controlling the first auxiliary circuit 42 into the open state, and controlling the second auxiliary circuit 44 into the closed state. Two resistors belonging to the same foot or to two neighboring feet in the bathroom scale are short-circuited in turn. Furthermore, a resistor short-circuited by the first auxiliary circuit and at least one resistor short-circuited by the second auxiliary circuit belong to two neighboring feet in the bathroom scale.

The fifth step E5 consists of performing a third measurement M3 of the output signal with the second auxiliary circuit 44 in the closed state. Measurement M3 is also a weight measurement with a greater contribution from a front/rear or right/left offset. However, the contributions of the offsets differ from those of the second measurement M2.

In step E6, the vector M formed by measurements M1, M2, and M3 can be multiplied by the transition matrix A to obtain a weight value P from which the influence of an offset has been eliminated, an offset value in the front/rear direction, and an offset value in the right/left direction.

Thus, in step E7, the obtained values are used. The weight P, from which the offset has been eliminated, can be displayed to the user. The offset values can be used to clean a BCG signal. The offset values can be used to interact with the scale. The offset values can also be used to analyze the user's balance.

Step E8 consists of sending the weight, the offset, and/or the BCG signal to the smartphone and the server. The user can then access the measured information without being on the bathroom scale, in particular from his smartphone or a computer.

Figure 17:
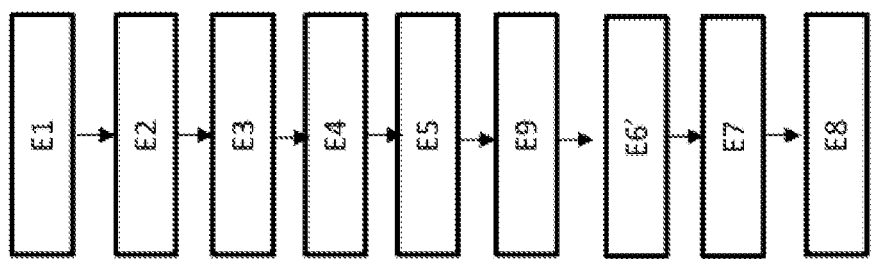
FIG. 17 shows a flowchart of the method implemented by the weighing device of FIG. 1.

FIG. 17 illustrates another method 200 comprising an additional step. Steps E1 to E5 are identical to those described above for method 100.

Step E9 consists of performing a fourth measurement M4 of the output signal ΔV with the third auxiliary circuit 56 in the closed state. Measurement M4 is then a measurement of the weight with a contribution from a front/rear or right/left offset that is different from that of the first and second measurements.

Therefore, in step E6, the vector M formed by measurements M1, M2, M3, and M4 defines a four-dimensional space. Vector M can be multiplied by the transition matrix A'. In this manner, in addition to the weight P and the offset values in the front/rear and right/left directions, a value corresponding to the torsion of the plate 58 is obtained. Establishing the torsion of the plate makes it possible to improve the precision of the weight and offset values, which can be calculated while taking torsion into account.

Steps E7 to E8 are then identical to those described above for method 100.

The order in which measurements M1, M2, M3, M4, etc. are performed is not important. In one embodiment, the frequency F of obtaining measurements is between a few Hz and a few hundred Hz, which means that a measurement is made every 1/F seconds. Obtaining all the measurements therefore generally takes less than 0.5 seconds, or even less than 0.1 seconds or less than 0.01 seconds, which are short time intervals, during which the user remains motionless (there will be no displacement in the distribution of mass during the measurements).

The invention is not limited solely to the examples described above but is capable of numerous variations accessible to those skilled in the art.

For example, it is possible to imagine alternative arrangements of auxiliary circuits making it possible to ascertain a weight, a front-rear offset, and/or a right/left offset.

In addition, it is possible to perform a fifth measurement M5 with two auxiliary circuits 42, 44 in the closed state. This measurement is possible in particular in the case of auxiliary circuits arranged on two neighboring load cells, or in the case of a two-part auxiliary circuit combined with an auxiliary circuit on a load cell distinct from those partly short-circuited by the two-part auxiliary circuit. The fifth measurement M5 can then be added to vector M to ascertain the values of the weights and offsets. Alternatively, the fifth measurement M5 can be a replacement for another measurement, as long as no information is lost among the various measurements M1, M2, M3, M4, or M5.

In addition, one of the measurements can be made with two auxiliary circuits in the closed state at the same time. In this case, the short circuit formed by the two combined auxiliary circuits is symmetrical relative to axis A1 or A2. The Wheatstone bridge thus remains balanced.

Due to the knowledge of the front/rear, left/right imbalances and even due to the torsion, the weighing device can be used as a controller for an electronic system (either the weighing device itself, as described above for when a selection is to be made, or a computer or a game console).

The invention claimed is:

1. A weighing device for an electronic bathroom scale comprising four feet, including respectively a left front foot, a right front foot, a left rear foot, and a right rear foot, the left front foot comprising a left front load cell, the right front foot comprising a right front load cell, the left rear foot comprising a left rear load cell, and the right rear foot comprising a right rear load cell, each load cell of the left front, right front, left rear and right rear load cells comprising at least two resistors, the left front, right front, left rear and right rear load cells being combined in a Wheatstone bridge assembly comprising:

a first branch and a second branch, the first and second branches being mounted in parallel between a reference voltage and a ground potential, the first and second branches being arranged on either side of a first axis of symmetry passing through the reference voltage and the ground potential;

a first intermediate point, on the first branch, and a second intermediate point, on the second branch, the first and second branches comprising a same number of resistors on either side of the first and second intermediate points, respectively, so as to define a second axis of symmetry passing through the first and second intermediate points; and a first auxiliary circuit, configured to selectively short-circuit two resistors (a) belonging to a same load cell of a first foot of the four feet in the weighing device so as to short-circuit only said load cell of the first foot in said Wheatstone bridge assembly or (b) belonging to two neighboring load cells of two neighboring first feet of the four feet in the weighing device so as to short-circuit only part of the at least two resistors of each of said two neighboring cells in said Wheatstone bridge assembly, the first auxiliary circuit being symmetrical relative to the first axis or the second axis, the assembly being controlled by an electronic control unit.

2. The weighing device according to claim 1, wherein the assembly comprises a second auxiliary circuit, the second auxiliary circuit being configured to short-circuit two resistors belonging to a same second foot of the four feet or to two neighboring second feet of the four feet in the weighing device, the second auxiliary circuit being symmetrical relative to the first axis or second axis.

3. The weighing device according to claim 2, wherein the assembly comprises a third auxiliary circuit, the third auxiliary circuit being symmetrical relative to the first axis or second axis, the first, second, and third auxiliary circuits being configured to concern three load cells among the left front, right front, left rear and right rear load cells.

4. The weighing device according to claim 3, wherein the first, second, and third auxiliary circuits are configured to short-circuit the three load cells of the left front, right front, left rear and right rear load cells.

5. The weighing device according to claim 1, wherein the assembly comprises a second auxiliary circuit, the second auxiliary circuit being configured to short-circuit two resistors belonging to a same second foot of the four feet or to two neighboring second feet of the four feet in the weighing device, the second auxiliary circuit being symmetrical relative to the first axis or second axis, and at least one resistor short-circuited by the first auxiliary circuit and at least one resistor short-circuited by the second auxiliary circuit belong to two neighboring feet of the four feet.

6. The weighing device according to claim 1, wherein the first auxiliary circuit comprises at least one switch controlled by the electronic control unit.

7. The weighing device according to claim 1, wherein the first auxiliary circuit comprises two switches controlled by the electronic control unit.

8. The weighing device according to claim 1, wherein the first auxiliary circuit is connected to at least one among: the reference voltage, the ground potential, the first intermediate point, or the second intermediate point.

9. The weighing device according to claim 1, wherein the first and second intermediate points are connected to a single amplifier so as to obtain an output signal from the assembly.

10. A method implemented in a weighing device according to claim 1, comprising:

performing a first measurement of an output signal from the assembly;

controlling the first auxiliary circuit into a closed state;

performing a second measurement of the output signal from the assembly, and establishing a weight and offset of a user based on the first and second measurements.

11. The method according to claim 10, the assembly of the weighing device comprising a second auxiliary circuit, the second auxiliary circuit being configured to short-circuit two resistors belonging to a same second foot of the four feet or to two neighboring second feet of the four feet in the weighing device, the second auxiliary circuit being symmetrical relative to the first axis or second axis, the method further comprising, before or after the second measurement:

controlling the second auxiliary circuit into a closed state;

performing a third measurement of the output signal from the assembly, and establishing a weight, a front-rear offset, and a right-left offset of the user, based on the first, second, and third measurements.

12. The method according to claim 11, the assembly of the weighing device comprising a third auxiliary circuit, the third auxiliary circuit being symmetrical relative to the first axis or second axis, the first, second, and third auxiliary circuits being configured to concern three load cells among the left front, right front, left rear and right rear load cells, the method further comprising, before or after any among the first, second, or third measurement:

controlling the third auxiliary circuit into a closed state;

performing a fourth measurement of the output signal from the assembly; and establishing the weight, front-rear offset, right-left offset of the user and a bending of a plate of the weighing device, based on the first, second, third, and fourth measurements.

13. The method according to claim 10, the assembly of the weighing device comprising a second auxiliary circuit, the second auxiliary circuit being configured to short-circuit two resistors belonging to a same second foot of the four feet or to two neighboring second feet of the four feet in the weighing device, the second auxiliary circuit being symmetrical relative to the first axis or second axis, the method further comprising, before or after any among the first or second measurement:

controlling the second auxiliary circuit into a closed state;

performing a third measurement of the output signal from the assembly;

establishing at least a weight of a user and a bending of a plate of the weighing device, based on the first, second, and third measurements.

14. The method according to claim 10, wherein the weight, front-rear offset, and right-left offset is calculated by multiplying a vector, composed of the first, second, and third measurements by a transition matrix.

15. The method according to claim 14, wherein the transition matrix is obtained by a theoretical calculation.

16. The method according to claim 14, wherein the transition matrix is obtained experimentally.

17. The method according to claim 10, wherein a front-rear and/or right-left offset allows at least one among: an interaction of the weighing device with a user, a cleaning of a ballistocardiography signal, and/or an analysis of the user's balance on the weighing device.

18. The method according to claim 10, further comprising controlling an electronic system, using the obtained offset.

19. A method comprising controlling an electronic system with the weighting device according to claim 1.

20. An electronic device controller, comprising the weighting device according to claim 1.

* * * * *